United States Patent
Hirota et al.

(10) Patent No.: US 6,199,374 B1
(45) Date of Patent: Mar. 13, 2001

(54) EXHAUST GAS PURIFYING DEVICE FOR ENGINE

(75) Inventors: Shinya Hirota, Susono; Toshiaki Tanaka, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/174,409

(22) Filed: Oct. 19, 1998

(30) Foreign Application Priority Data

Oct. 22, 1997 (JP) .................................................. 9-289907
May 1, 1998 (JP) ................................................ 10-122449
Sep. 11, 1998 (JP) ................................................ 10-258339

(51) Int. Cl.⁷ .................................. F01N 3/00; F01N 7/00
(52) U.S. Cl. ................................. 60/277; 60/285; 60/301
(58) Field of Search ............................. 60/295, 301, 286, 60/285, 277, 303, 274

(56) References Cited

U.S. PATENT DOCUMENTS 5,479,775 * 1/1996 Kraemer et al. ..................... 60/274
5,778,666 * 7/1998 Cullen et al. ........................ 60/274

FOREIGN PATENT DOCUMENTS

| 53-100314 | 9/1978 | (JP) . |
| 6-66129 | 3/1994 | (JP) . |
| 6-88518 | 3/1994 | (JP) . |
| 6-229231 | 8/1994 | (JP) . |
| 7-217474 | 8/1995 | (JP) . |

* cited by examiner

Primary Examiner—Jeanette Chapman
Assistant Examiner—Sneh Varma
(74) Attorney, Agent, or Firm—Oliff & Berridge, PLC

(57) ABSTRACT

An exhaust gas purifying device for an engine comprises a catalyst arranged in the exhaust passage for purifying the exhaust gas, the catalyst having an oxidizing ability. An amount of sulfate adsorbed in the catalyst is obtained. When the adsorbed sulfate amount becomes larger than a predetermined amount, a reducing agent is fed to the catalyst temporarily to desorb the adsorbed sulfate from the catalyst and reduce the sulfate. At this time, the amount of the reducing agent is set to make the air-fuel ratio of the exhaust gas flowing into the catalyst rich.

28 Claims, 32 Drawing Sheets

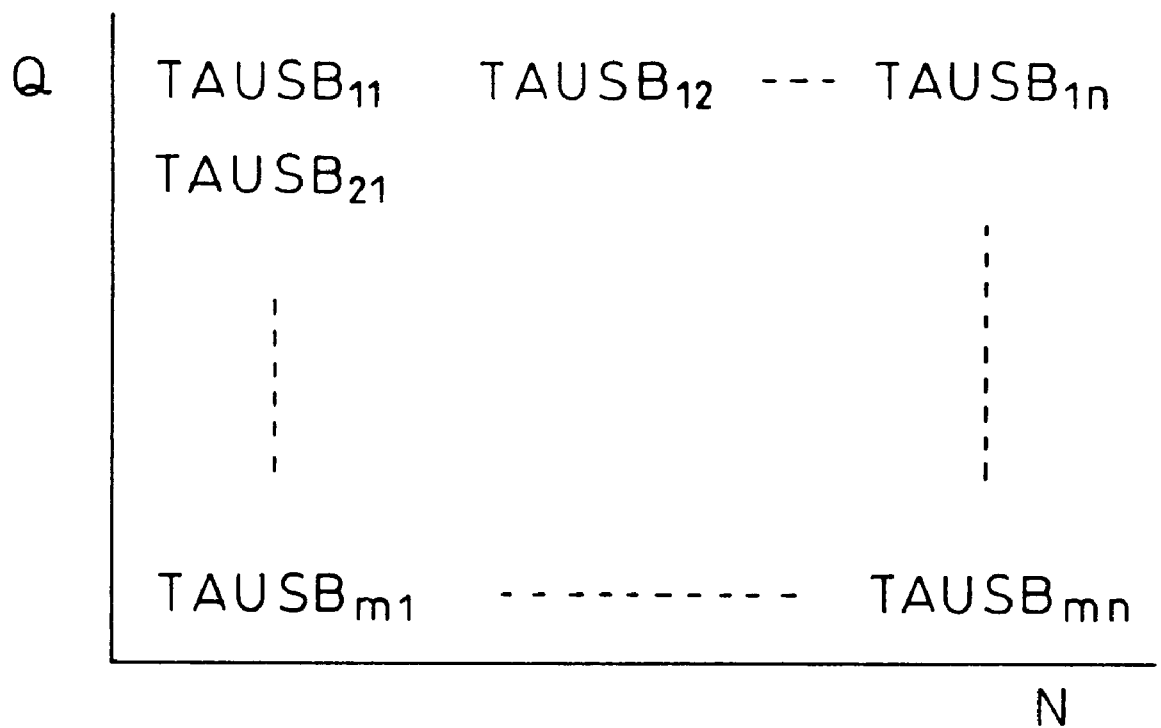

6,199,374 B1

EXHAUST GAS PURIFYING DEVICE FOR ENGINE

BACKGROUND OF THE INVENTION

1. Field of the Invention

The present invention relates to an exhaust gas purifying device for an engine.

2. Description of the Related Art

It is well known that an engine in which a lean air-fuel mixture is burned is provided with a catalyst having an oxidizing ability arranged in the exhaust passage of the engine. In the engine, the unburned hydrocarbon (HC) and carbon monoxide CO contained in the exhaust gas are oxidized in the catalyst in the oxidizing atmosphere and converted to $H_2O$ and $CO_2$. However, the exhaust gas flowing into the catalyst also contains sulfur dioxide $SO_2$ and the $SO_2$ is converted, in the catalyst in the oxidizing atmosphere, to sulfur trioxide $SO_3$. If the $SO_3$ reacts with $H_2O$ in the catalyst, $H_2SO_4$ is synthesized.

It is undesirable that the $H_2SO_4$ is discharged from the catalyst in the form of the mist of sulfuric acid. To solve this problem, Japanese Unexamined Patent Publication No. 53-100314 discloses an exhaust gas purifying device for an engine in which the reducing agent is fed to the catalyst to reduce $SO_3$ and $H_2SO_4$, i.e., sulfates, in the catalyst to $SO_2$.

To reduce the sulfates in the catalyst sufficiently, it is required that the concentration of the reducing agent in the exhaust gas flowing into the catalyst is always made relatively high. However, in a case where the lean air-fuel mixture is burned in the engine, the large amount of the reducing agent is needed to make the concentration of the reducing agent in the inflowing exhaust gas high and, if such a feeding of the reducing agent is performed continuously, a large amount of the reducing agent is needed.

SUMMARY OF THE INVENTION

An object of the present invention is to provide an exhaust gas purifying device capable of reducing the amount of the reducing agent required for reducing sulfate, while maintaining the amount of sulfate discharged from the catalyst small.

According to the present invention, there is provided an exhaust gas purifying device for an engine having an exhaust passage through which the exhaust gas including excess oxygen flows, comprising: a catalyst arranged in the exhaust passage for purifying the exhaust gas, the catalyst having an oxidizing ability; feeding means capable of feeding a reducing agent to the catalyst; and judging means for obtaining an amount of sulfate adsorbed in the catalyst and judging whether the adsorbed sulfate amount is larger than a predetermined amount; and control means for controlling the feeding means to feed the reducing agent to the catalyst temporarily to desorb the adsorbed sulfate from the catalyst and to reduce the sulfate when the adsorbed sulfate amount is judged to be larger than the predetermined amount.

The present invention may be more fully understood from the description of the preferred embodiments of the invention as set forth below, together with the accompanying drawings.

BRIEF DESCRIPTION OF THE DRAWINGS

In the drawings:

FIG. 5 shows a diagram showing the basic secondary fuel injection time TAUSB;

DESCRIPTION OF THE PREFERRED EMBODIMENTS

Figure 1:
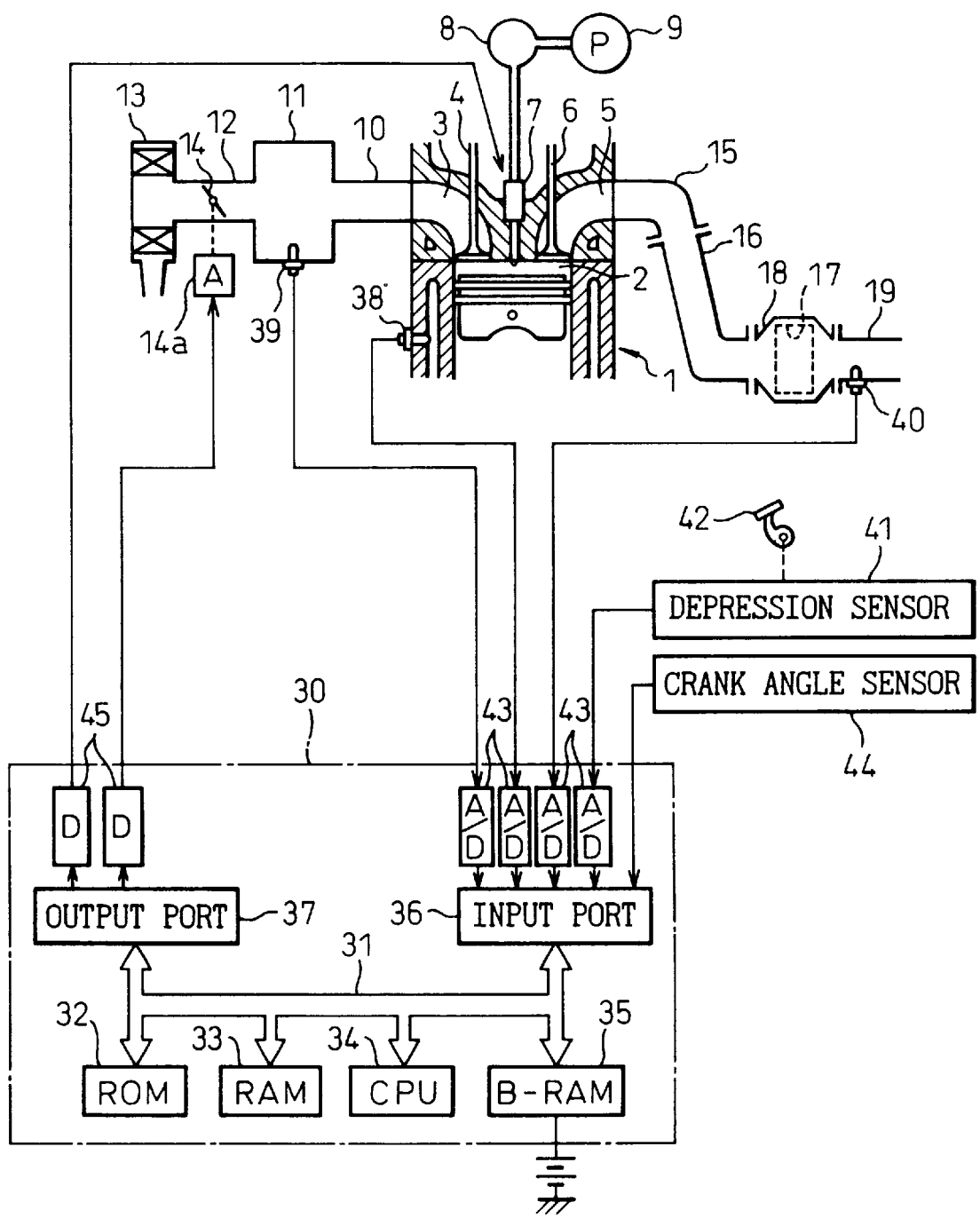
FIG. 1 is a general view of an engine.

FIG. 1 illustrates the present invention applied to a diesel engine. Alternatively, the present invention may be applied to a spark-ignition engine.

Referring to FIG. 1, a reference numeral 1 designates an engine body, 2 designates a combustion chamber, 3 designates an intake port, 4 designates an intake valve, 5 designates an exhaust port, 6 designates an exhaust valve, and 7 designates a fuel injector, of an electromagnetic type, for injecting fuel directly into the combustion chamber 2. Each fuel injector 7 is connected to a fuel pump 9 via a common fuel accumulator 8. This allows the fuel injectors 7 to inject fuel at a plurality of times during one combustion cycle of the corresponding cylinders. The intake ports 3 of each cylinder are connected to a common surge tank 11 via corresponding branch 10, and the surge tank 11 is connected to an air cleaner 13 via an intake duct 12. An intake air control valve 14 is disposed in the intake duct 12, and is driven by an actuator 14a. On the other hand, the exhaust ports 5 of each cylinder are connected, via a common exhaust manifold 15 and an exhaust pipe 16, to a catalytic converter 18 housing an exhaust gas purifying catalyst 17 therein, and the converter 18 is connected to an exhaust pipe 19. Note that the fuel injectors 7 and the actuator 14a are controlled by output signals from an electronic control unit 30.

The electronic control unit (ECU) 30 is constructed as a digital computer and comprises a read-only memory (ROM) 32, a random-access memory (RAM) 33, the CPU (microprocessor) 34, a backup RAM (B-RAM) 35 to which the electric power is always supplied, an input port 36, and an output port 37, which are interconnected with each other via a bidirectional bus 31. A water temperature sensor 38, which generates an output voltage in proportion to the temperature of the engine cooling water, is attached to the engine body 1. A pressure sensor 39, which generates an output voltage in proportion to the pressure in the surge tank 11, is disposed in the surge tank 11. A temperature sensor 40, which generates an output voltage in proportion to the temperature of the exhaust gas discharged from the catalyst 17, is arranged in the exhaust pipe 19 adjacent to the downstream end of the catalyst 17. This temperature of the exhaust gas represents the catalyst temperature TCAT. Further, an depression sensor 41 generates an output voltage in proportion to a depression DEP of an acceleration pedal 42. The output voltages of the sensors 38, 39, 40, 41 are input to the input port 36 via corresponding AD converters 43, respectively. The input port 36 is also connected to a crank angle sensor 44, which generates a pulse whenever a crankshaft is turned by, for example, 30 degrees. According to these pulses, the CPU 34 calculates the engine speed N. The output port 37 is connected to the fuel injectors 7 and the actuator 14a via corresponding drive circuits 45, respectively.

In the engine shown in FIG. 1, the exhaust gas purifying catalyst 17 is comprised of precious metal, such as platinum Pt, palladium Pd, rhodium Rh, and iridium Ir, or transition metal, such as copper Cu, iron Fe, cobalt Co, and nickel Ni, carried on a porous carrier, such as zeolite, mordenite, ferrierite, alumina $Al_2O_3$. For zeolite, silica rich zeolite, such as ZSM-5 zeolite, may be used. In the oxidizing atmosphere including the reducing agent, such as hydrocarbon HC and carbon monoxide CO, the catalyst 17 can selectively react $NO_x$ with the HC and CO, to thereby reduce the $NO_x$ to nitrogen $N_2$. Namely, the catalyst 17 can reduce $NO_x$ in the catalyst 17, even in the oxidizing atmosphere, if the inflowing exhaust gas includes the reducing agent. In other words, the catalyst 17 has a oxidizing ability in which HC and CO is oxidized to generate $H_2O$ or $CO_2$.

In the diesel engine shown in FIG. 1, the air-fuel mixture is burned with an excess air to reduce the undesirable smoke and particulate discharged from the engine. Thus, the catalyst 17 is usually kept in the oxidizing atmosphere. As a result, $NO_x$ is effectively reduced in the catalyst 17.

In this case, unburned HC and CO discharged from the engine can act as a reducing agent. However, the amount of $NO_x$ to be purified is much larger than that of the unburned HC and CO discharged from the engine, and the amount of reducing agent will be too little to purify $NO_x$ sufficiently. Thus, in the engine shown in FIG. 1, the reducing agent is secondarily fed to the catalyst 17, to thereby avoid a shortage of the reducing agent with respect to $NO_x$.

To feed the reducing agent to the catalyst 17 secondarily, there may be provided a reducing agent feeding device in the exhaust passage upstream of the catalyst 17 for feeding the reducing agent. Further, hydrocarbon such as gasoline, isooctane, hexane, heptane, gas oil, and kerosine, or hydrocarbon which can be stored in a liquid form, such as butane or propane, can be used as the reducing agent. However, in the present embodiment, fuel of the engine (hydrocarbon) is used as the reducing agent, and the reducing agent is fed to the catalyst 17 by the fuel injector 7 injecting fuel at the combustion stroke or the exhaust stroke of the engine. The fuel injection at the combustion stroke or the exhaust stroke, i.e., the secondary fuel injection, is different from an usual fuel injection performed around the top-dead-center of the compression stroke to obtain the engine output, i.e., the main fuel injection, and does not contribute to the engine output. This omits an additional feeding device and an additional tank for the reducing agent.

Figure 2:
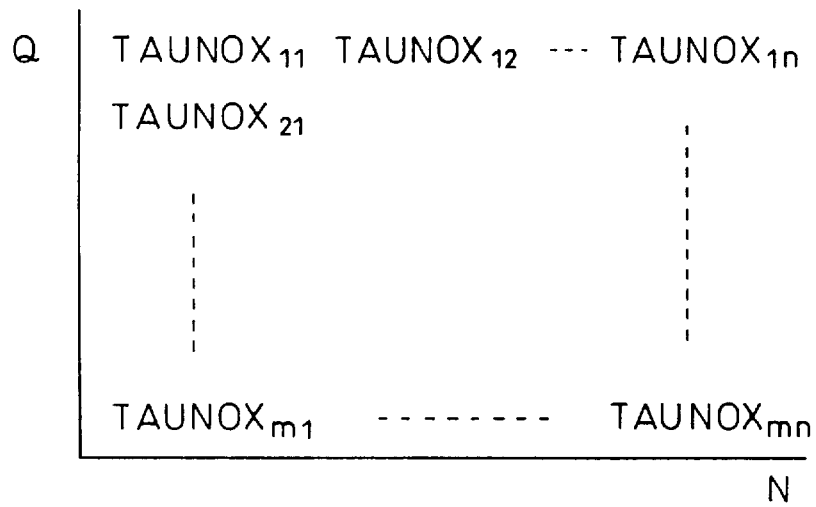
FIG. 2 shows a diagram showing the secondary fuel injection time for $NO_x$ reduction TAUNOX.

The secondary fuel injection time TAUNOX of the secondary fuel injection for $NO_x$ reduction is an injection time required for reducing almost all $NO_x$ flowing to the catalyst 17, for example. TAUNOX is stored as a function of the intake air amount Q and the engine speed N, for example, in the form of a map as shown in FIG. 2, in the ROM 32 in advance.

As mentioned at the beginning, the exhaust gas flowing into the catalyst 17 contains $SO_2$. The $SO_2$ is oxidized in the catalyst 17 in the oxidizing atmosphere and, thus, $SO_3$ is synthesized. If the $SO_3$ reacts with $H_2O$ in the catalyst 17, $H_2SO_4$ is synthesized. However, it is undesirable that the $H_2SO_4$ is discharged from the catalyst 17 in the form of a mist of sulfuric acid.

Figure 3A:
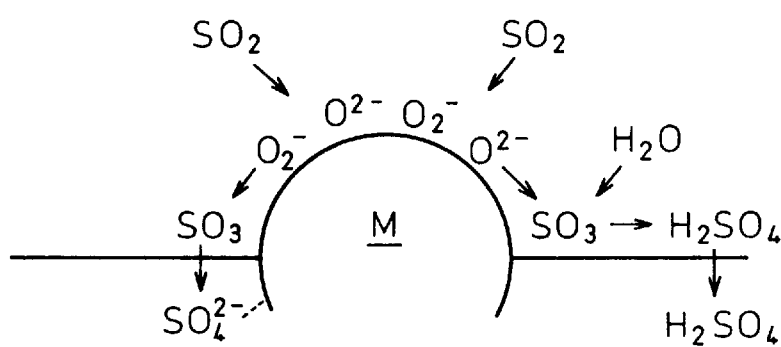
FIGS. 3A and 3B are schematic illustrations for explaining the sulfate adsorption and the sulfate desorption and reduction, of the catalyst.

On the other hand, the catalyst 17 usually has a sulfate adsorbing ability. While the sulfate adsorbing operation of the catalyst 17 is not cleared sufficiently, the sulfate adsorbing operation is considered to be performed according to the following mechanism as shown in FIG. 3A. Namely, when the amount of the reducing agent existing in the catalyst 17 is small, oxygen $O_2$ adheres to the surface of the catalytic metal M of the catalyst 17 in the form of $O_2^-$ or $O^{2-}$, as shown in FIG. 3A. $SO_2$ in the catalyst 17 reacts with the oxygen $O_2^-$ or $O^{2-}$ on the surface of the catalytic metal M and synthesizes $SO_3$ ($2SO_2 + O_2 \rightarrow 2SO_3$). Then, a part of the synthesized $SO_3$ reacts with $H_2O$ in the catalyst 17 and synthesizes $H_2SO_4$, and is adsorbed in the micropores of the carrier of the catalyst 17 in the form of $H_2SO_4$. Otherwise, a part of $SO_3$ is further oxidized and is adsorbed in the micropores in the form of $MSO_4$.

Alternatively, it is considered that sulfate is adsorbed in the catalyst 17 when the concentration of oxygen in the catalyst 17 is high, or the pressure in the catalyst 17 is high, or the temperature of the catalyst 17 is low.

Contrarily, when the reducing agent is fed to the catalyst 17, the amount of the sulfate adsorbed in the catalyst 17 is reduced while the amount of sulfate discharged from the catalyst 17 is maintained small. It is considered that this is because the sulfate adsorbed in the catalyst 17 is desorbed from the catalyst 17 and the desorbed sulfate is reduced when the reducing agent is fed to the catalyst 17.

Figure 3B:
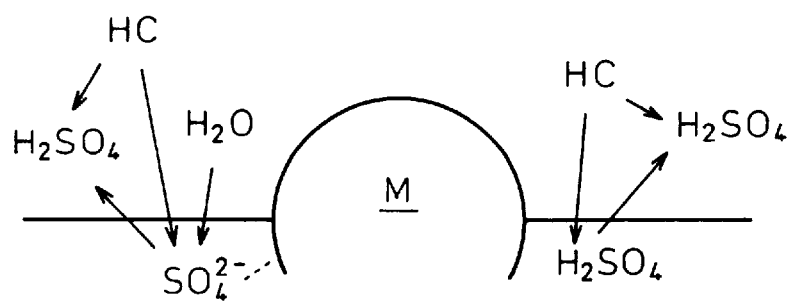

While the sulfate desorbing and reducing operation of the catalyst 17 is not cleared sufficiently, the sulfate desorbing and reducing operation is considered to be performed according to the following mechanism as shown in FIG. 3B. Namely, when the amount of the reducing agent existing in the catalyst 17 becomes larger, $H_2SO_4$ adsorbed in the catalyst 17 is desorbed or released from the catalyst 17 in the form of $H_2SO_4$. Otherwise, $MSO_4$ adsorbed in the catalyst 17 reacts with $H_2O$ in the catalyst 17 and synthesizes $H_2SO_4$, and is desorbed or released from the catalyst 17 in the form of $H_2SO_4$. The $H_2SO_4$ desorbed from the catalyst 17 then reacts with the reducing agent (HC) and, therefore, the sulfate is reduced. Otherwise, first, the reducing agent (HC) is adsorbed in the catalyst 17 and, then, reacts with the $H_2SO_4$ or $MSO_4$ adsorbed in the catalyst 17 to reduce the $H_2SO_4$ or $MSO_4$. In either case, when the amount of the reducing agent existing in the catalyst 17 becomes larger, the amount of sulfate adsorbed in the catalyst 17 becomes smaller. Further, $SO_3$ in the catalyst 17 may be reduced by the reducing agent at this time.

Alternatively, it is considered that sulfate is desorbed or released from the catalyst 17 when the concentration of oxygen in the catalyst 17 becomes low, or the pressure in the catalyst 17 becomes low, or the temperature of the catalyst 17 becomes high and, if the reducing agent exists in the catalyst 17 at this time, the sulfate is desorbed and reduced by the reducing agent.

In the engine shown in FIG. 1, usually, the air-fuel mixture is burned with the excess air, although the secondary fuel injection for $NO_x$ reduction is performed, as mentioned above. Thus, the concentration of the reducing agent in the exhaust gas flowing into the catalyst 17 is usually kept relatively low. Accordingly, the sulfate synthesized in the catalyst 17 at the usual engine operation is adsorbed in the catalyst 17 and, therefore, the amount of sulfate discharged from the catalyst 17 is kept small. However, the sulfate adsorbing ability of the catalyst 17 has a limit and, thus, the sulfate must be desorbed from the catalyst 17 before the catalyst 17 is saturated with the sulfate.

Thus, in the present embodiment, the amount of sulfate adsorbed in the catalyst 17 is obtained and, when the adsorbed sulfate amount becomes larger than a predetermined amount, the secondary fuel injection for sulfate reduction is performed temporarily to feed the reducing agent to the catalyst 17, to thereby desorb the sulfate from the catalyst 17 and reduce the desorbed sulfate.

It is difficult to obtain the adsorbed sulfate amount of the catalyst 17 directly. Thus, in the present embodiment, the adsorbed sulfate amount is estimated on the basis of the engine operating condition. Namely, the amount of sulfate flowing into the catalyst 17 can be obtained on the basis of the engine operating condition.

Figure 4A:
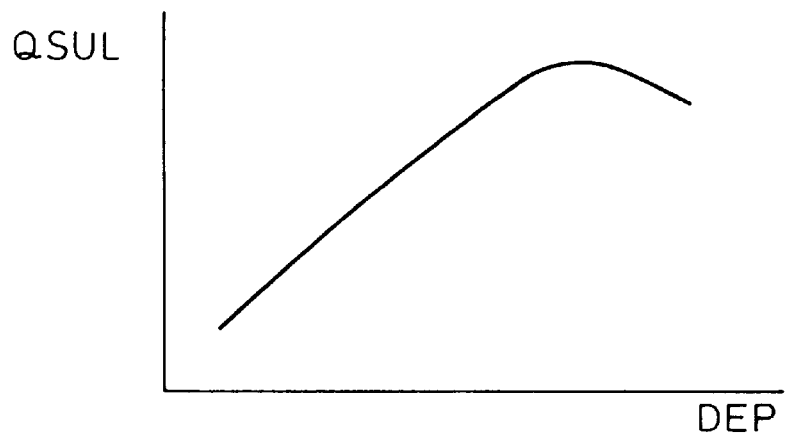
FIGS. 4A to 4C show diagrams showing the inflowing sulfate amount QSUL.
Figure 4B:
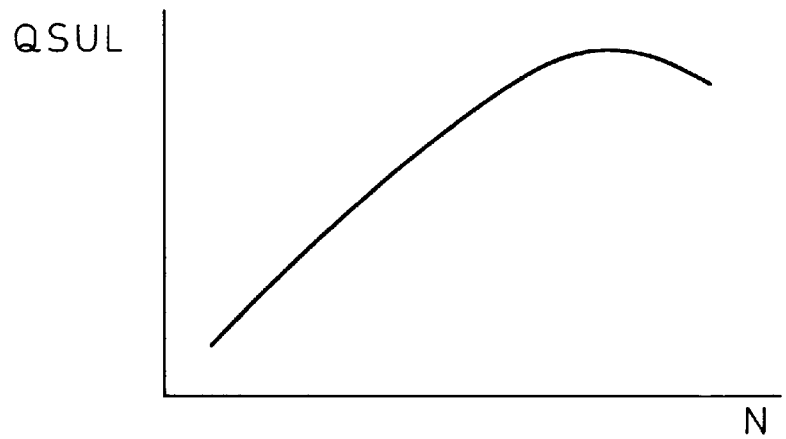
Figure 4C:
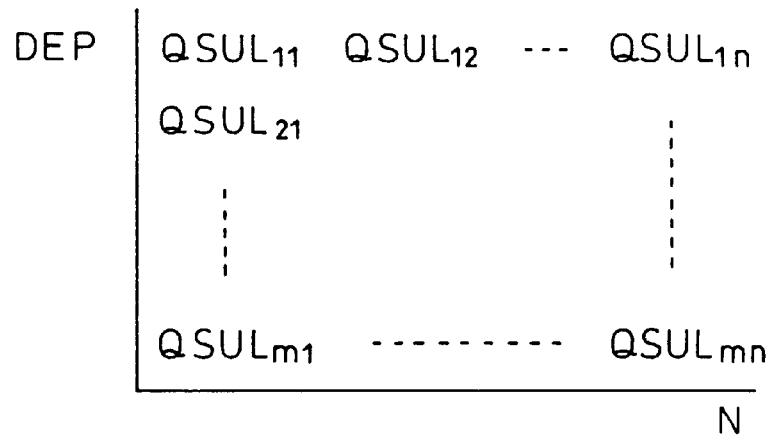

FIGS. 4A to 4C show the amount of sulfate QSUL flowing into the catalyst 17 per unit time per unit fuel injection time. As shown in FIG. 4A, the inflowing sulfate amount QSUL becomes larger as the depression DEP of the acceleration pedal 42 becomes larger, and becomes smaller as the depression DEP becomes larger when the depression DEP is considerably large. Further, as shown in FIG. 4B, the inflowing sulfate amount QSUL becomes larger as the engine speed N becomes higher, and becomes smaller as the engine speed N becomes larger when the engine speed N is considerably high. The inflowing sulfate amount QSUL is stored in the ROM 32 in advance, in the form of a map as shown in FIG. 4C.

Thus, if the cumulative amounts of the main fuel injection time and the secondary fuel injection time for $NO_x$ reduction are represented by STAUM and STAUS, respectively, the sum of STAUM and STAUS is represented by STAU, and the time interval of the estimation of the adsorbed sulfate amount is represented by DLT, the estimated adsorbed sulfate amount SQSUL is represented as follows:

SQSUL=SQSUL+QSUL·STAU·DLT

When the estimated adsorbed sulfate amount SQSUL becomes larger than the predetermined value SQ1, the secondary fuel injection for sulfate reduction is started. During the secondary fuel injection for sulfate reduction, the secondary fuel injection for $NO_x$ reduction is stopped.

The secondary fuel injection time TAUSUL for the secondary fuel injection for sulfate reduction is calculated on the basis of the following equation, for example.

TAUSUL=TAUSB·KSUL where TAUSB and KSUL represent a basic secondary fuel injection time, and a correction coefficient, respectively.

The basic secondary fuel injection time TAUSB is a fuel injection time required for making the air-fuel ratio of the exhaust gas flowing into the catalyst 17 stoichiometric, and is stored in the ROM 32 in advance as a function of the intake air amount Q and the engine speed N, in the form of a map as shown in FIG. 5.

The correction coefficient KSUL is for controlling the air-fuel ratio of the exhaust gas flowing into the catalyst 17 when the secondary fuel injection for sulfate reduction is in process. If KSUL=1.0, the air-fuel ratio of the exhaust gas flowing into the catalyst 17 is made stoichiometric. If KSUL<1.0, the air-fuel ratio of the exhaust gas flowing into the catalyst 17 is made larger than the stoichiometric, i.e., is made lean, and if KSUL>1.0, the air-fuel ratio of the exhaust gas flowing into the catalyst 17 is made smaller than the stoichiometric, i.e., is made rich.

In the present embodiment, KSUL is set to be larger than 1.0, i.e., the air-fuel ratio of the exhaust gas flowing into the catalyst 17 when the secondary fuel injection for sulfate reduction is in process is made rich. As a result, the sulfate in the catalyst 17 can be desorbed and reduced rapidly and surely.

Figure 6A:
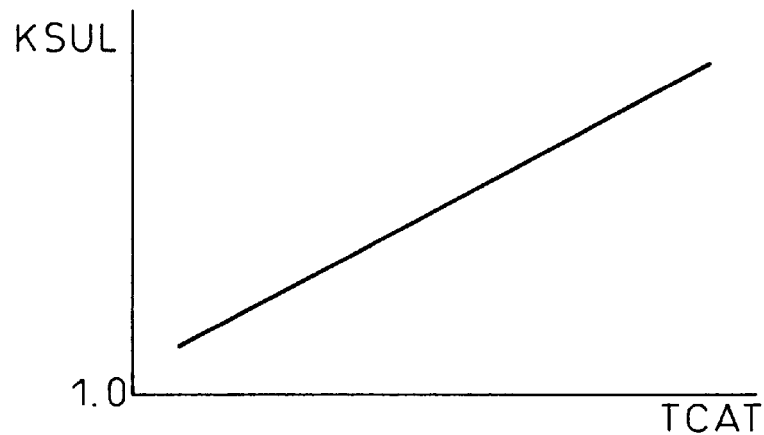
FIGS. 6A to 6C show diagrams showing the correction coefficient KSUL.

However, when the catalyst temperature TCAT becomes low, if a large amount of the reducing agent is fed to the catalyst 17, a large part of the reducing agent will be discharged from the catalyst 17 because the desorbing and reducing rate of sulfate become low. This also deteriorates the fuel consumption rate. Thus, in the present embodiment, the correction coefficient KSUL is set to become smaller as the catalyst temperature TCAT becomes lower, as shown in FIG. 6A, to thereby reduce the degree of richness of the air-fuel ratio of the exhaust gas flowing into the catalyst 17 as TCAT becomes lower.

Figure 6B:
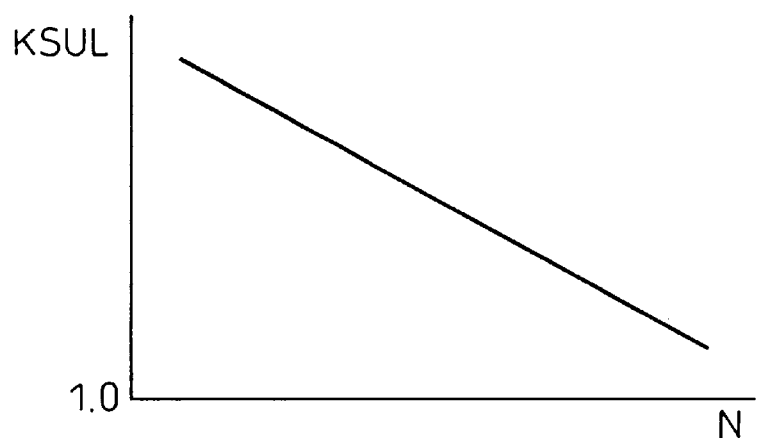
Figure 6C:
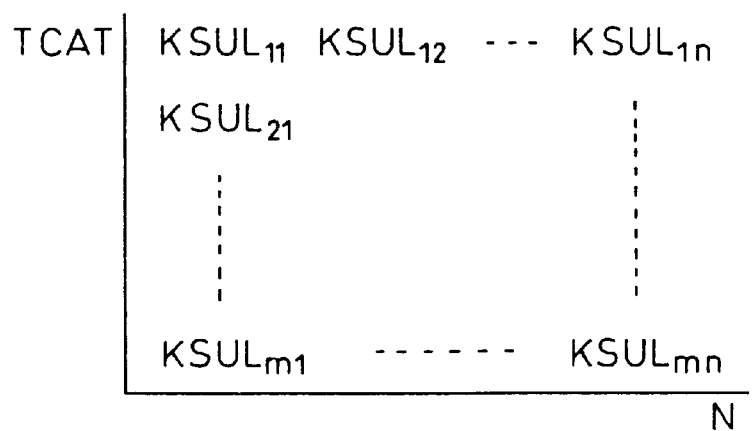

The secondary fuel injection is performed once when the main fuel injection is performed once. Thus, when the engine speed N becomes higher, the reducing agent fed to the catalyst 17 per unit time may be too much and the large amount of the reducing agent may be discharged from the catalyst 17. Thus, in the present embodiment, the correction coefficient KSUL is set to become smaller as the engine speed N becomes higher, as shown in FIG. 6B, to thereby reduce the degree of richness of the air-fuel ratio of the exhaust gas flowing into the catalyst 17 as the engine speed N becomes higher. In this way, the reducing agent can be used effectively for desorbing and reducing the sulfate. Note that the correction coefficient KSUL is stored in the ROM 32 in advance as a function of the catalyst temperature TCAT and the engine speed N, in the form of a map as shown in FIG. 6C.

Figure 7A:
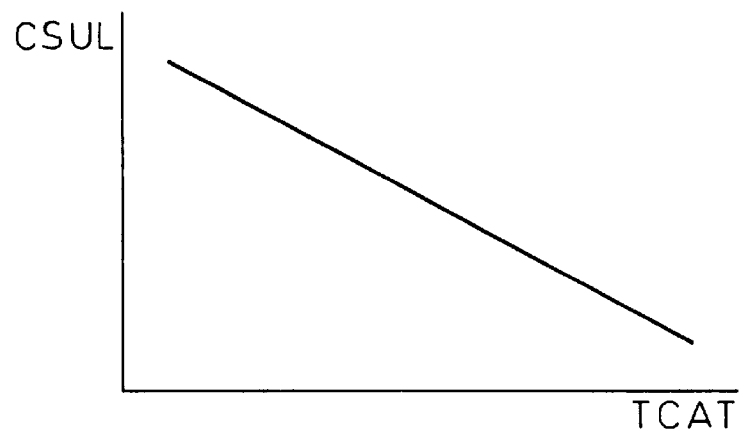
FIGS. 7A to 7C show diagrams showing the rich time coefficient CSUL.

On the other hand, the secondary fuel injection for sulfate reduction is performed for a rich time. When the catalyst temperature TCAT becomes higher, the desorption and reduction of the sulfate complete in a short time due to the high sulfate desorption and reduction rate. If the secondary fuel injection for sulfate reduction is continued after the desorption and reduction of the sulfate complete, the large amount of the reducing agent is discharged from the catalyst 17 and the fuel consumption rate is deteriorated. Thus, in the present embodiment, a rich time coefficient CSUL, which represents the rich time, is set to become smaller as TCAT becomes higher, as shown in FIG. 7A.

Figure 7B:
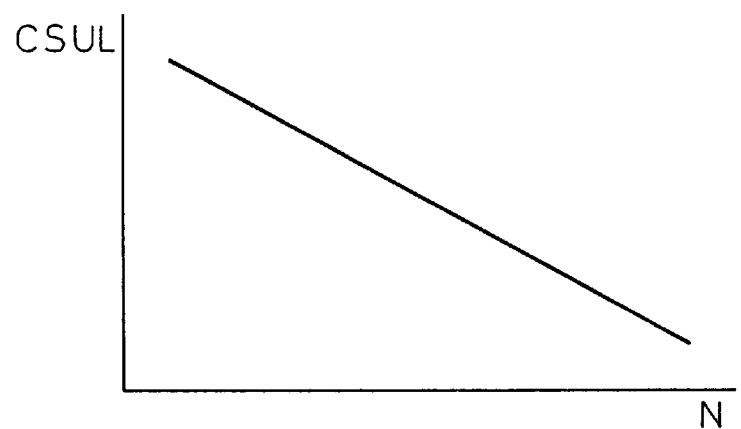
Figure 7C:
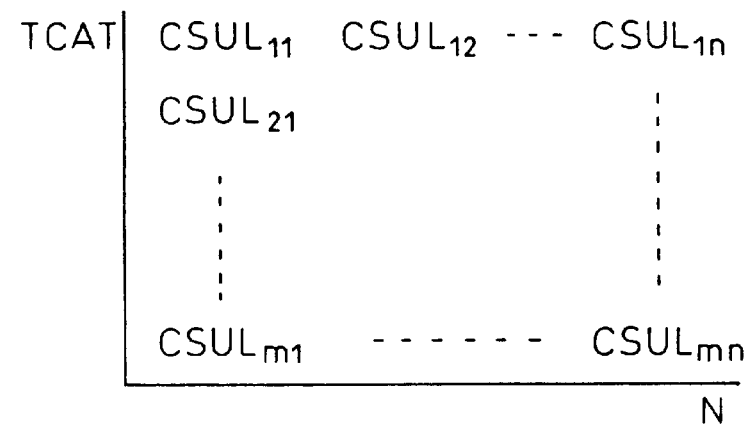

As mentioned above, when the engine speed N becomes higher, a large amount of the reducing agent may be discharged from the catalyst 17 and, therefore, it is undesirable that the secondary fuel injection for sulfate reduction is performed for a long time when the engine speed N is high. Thus, in the present embodiment, the rich time coefficient CSUL is set to become smaller as the engine speed N becomes higher, as shown in FIG. 7B. In this way, the reducing agent can be used further effectively for desorbing and reducing the sulfate. Note that the rich time coefficient CSUL is stored in the ROM 32 in advance as a function of the catalyst temperature TCAT and the engine speed N, in the form of a map as shown in FIG. 7C.

If the reducing agent is always fed to the catalyst 17, the synthesis of sulfate in the catalyst 17 is suppressed and, thus, the discharge of sulfate from the catalyst 17 is suppressed. However, the ratio of the amount of the reducing agent actually reducing the sulfate to the amount of the reducing agent fed to the catalyst 17 is relatively low. Thus, to reduce the sulfate in the catalyst 17 sufficiently, the concentration of the reducing agent in the exhaust gas flowing into the catalyst 17 must be made high. However, if the concentration of the reducing agent in the exhaust gas flowing into the catalyst 17 is always made high, a large amount of the reducing agent will be discharged from the catalyst 17. The fuel consumption rate is also deteriorated.

Contrarily, in the present embodiment, the secondary fuel injection for sulfate reduction is performed temporarily. Thus, the discharge of sulfate from the catalyst 17 is suppressed, while preventing the large amount of the reducing agent from being discharged from the catalyst 17 and preventing the fuel consumption rate from being deteriorated.

Figure 8:
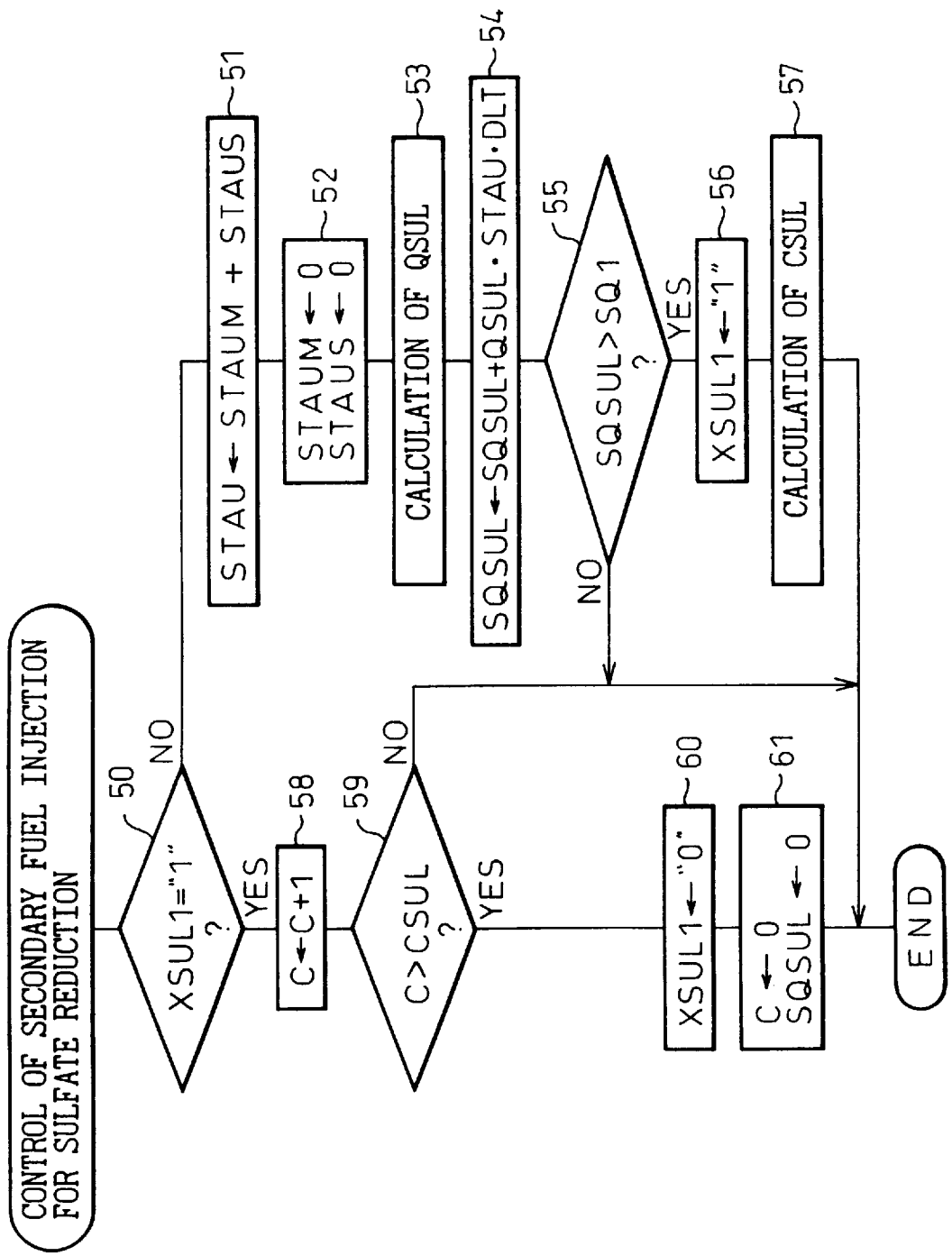
FIG. 8 shows a flowchart for controlling the secondary fuel injection for sulfate reduction.

FIG. 8 shows a routine for controlling the secondary fuel injection for sulfate reduction. The routine is executed by interruption every predetermined time.

Referring to FIG. 8, first, in step 50, it is judged whether a sulfate flag XSUL1 is set. The sulfate flag XSUL1 is set (XSUL1="1") when the secondary fuel injection for sulfate reduction must be performed, and is reset (XSUL1="0") when the secondary fuel injection for sulfate reduction must be stopped. When the sulfate flag XSUL1 is reset, the routine goes to step 51, where the sum STAU of the cumulative value of the main fuel injection time STAUM and the cumulative value of the secondary fuel injection time for $NO_x$ reduction STAUS is calculated. STAUM and STAUS are calculated in a routine explained later. In the following step 52, STAUM and STAUS are cleared. In the following step 53, the inflowing sulfate amount QSUL is calculated using the map shown in FIG. 4C. In the following step 54, the estimated adsorbed sulfate amount SQSUL is calculated on the basis of the following equation.

$$SQSUL = SQSUL + QSUL \cdot STAU \cdot DLT$$

where DLT represents a time interval from the preceding processing cycle to the present processing cycle. In the following step 55, it is judged whether the adsorbed sulfate amount SQSUL is larger than the predetermined value SQ1. If $SQSUL \leq SQ1$, the processing cycle is ended. If $SQSUL > SQ1$, the routine goes to step 56, where the sulfate flag XSUL1 is set. In the following step 57, the rich time coefficient CSUL is calculated using the map shown in FIG. 7C.

When the sulfate flag XSUL1 is set, the routine goes from step 50 to step 58, where counter value C, which represents the rich time, is incremented by 1. In the following step 59, it is judged whether the counter value C is larger than the rich time coefficient CSUL. If $C \leq CSUL$, the processing cycle is ended. If $C > CSUL$, the routine goes to step 60, where the sulfate flag XSUL1 is reset. In the following step 61, the counter value C and the adsorbed sulfate amount SQSUL are cleared.

Figure 9:
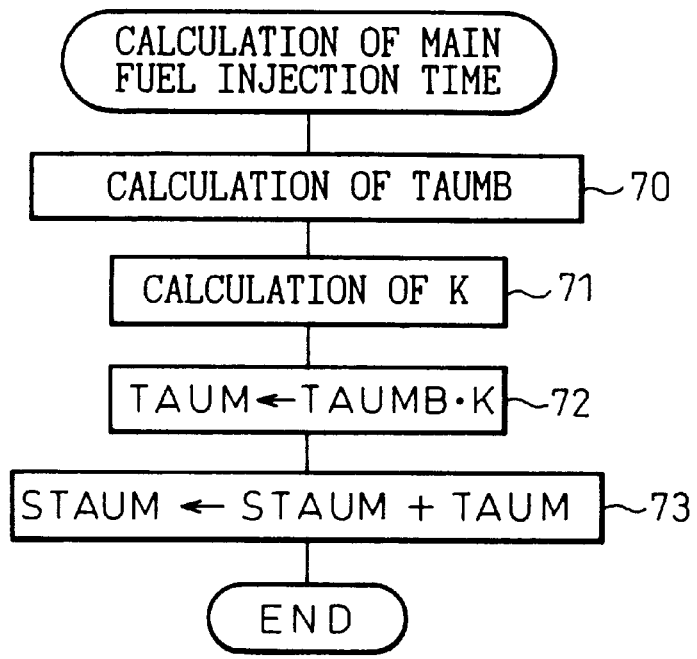
FIG. 9 shows a flowchart for calculating the main fuel injection time TAUM.

FIG. 9 shows a routine for calculating the main fuel injection time TAUM. The routine is executed by interruption every predetermined crank angle.

Figure 10:
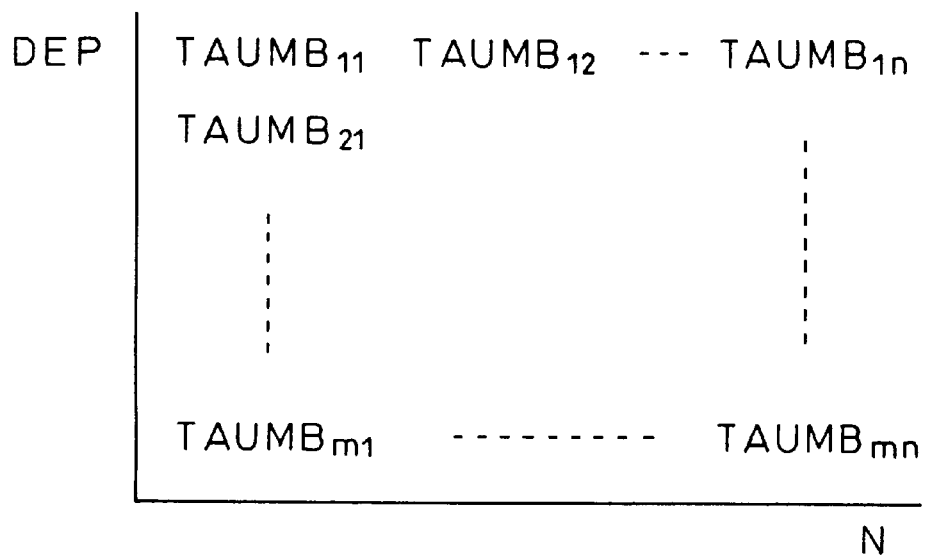
FIG. 10 shows a diagram showing the basic main fuel injection time TAUMB.

Referring to FIG. 9, first, in step 70, a basic main fuel injection time TAUMB is calculated. The basic main fuel injection time TAUMB is a fuel injection time required for obtaining the required output torque, for example, and is stored in the ROM 32 in advance as a function of the depression of the acceleration pedal DEP and the engine speed N, in the form of a map as shown in FIG. 10. In the following step 71, a correction coefficient K is calculated. The correction coefficient K represents the increasing correction coefficient for acceleration, and the increasing correction coefficient for warming up, for example, together. In the following step 72, the main fuel injection time TAUM is calculated by multiplying TAUMB by K. In the following step 73, the cumulative value STAUM of the main fuel injection time TAUM is calculated.

Figure 11:
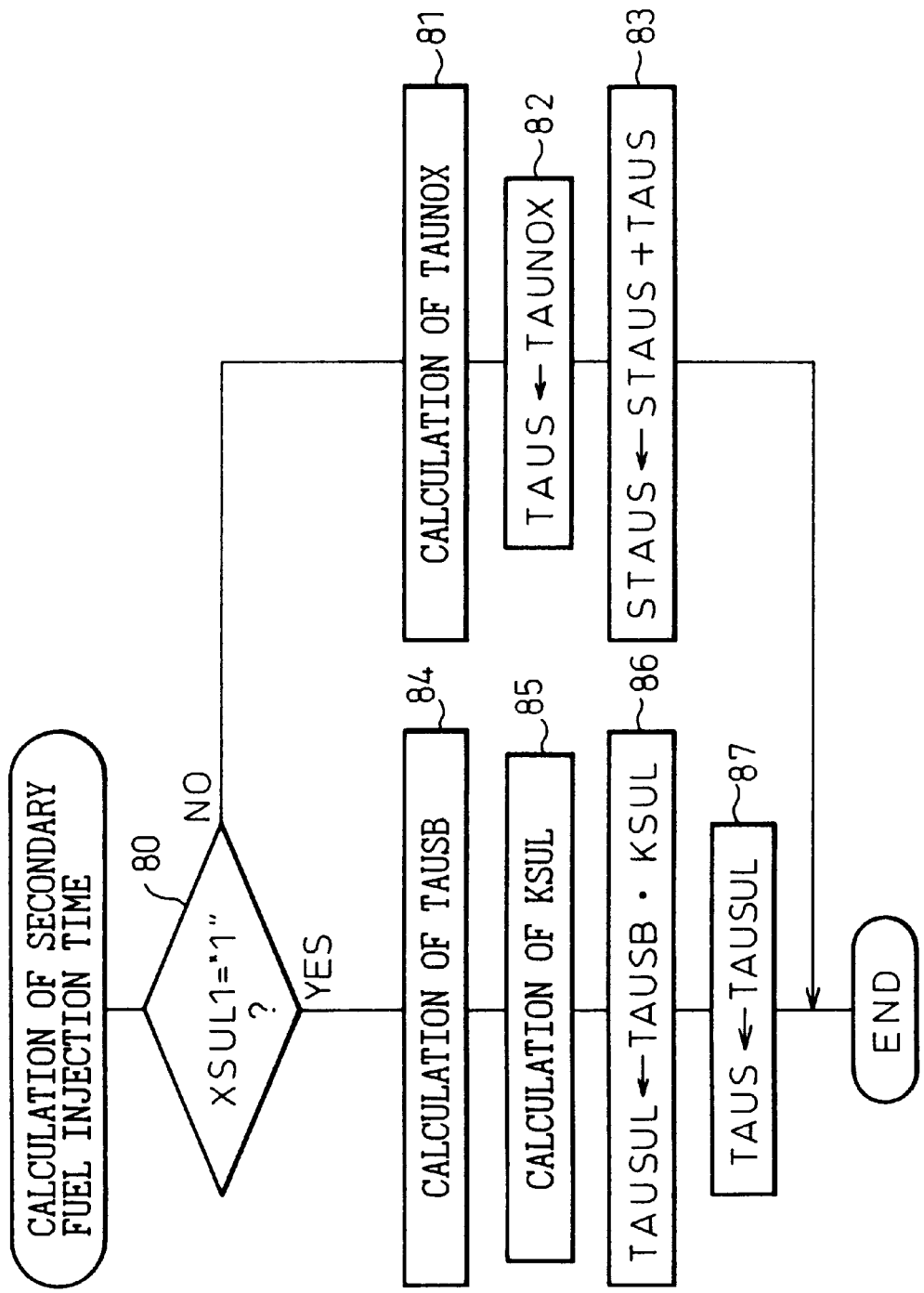
FIG. 11 shows a flowchart for calculating the secondary fuel injection time TAUS.

FIG. 11 shows a routine for calculating the secondary fuel injection time TAUS. The routine is executed by interruption every predetermined crank angle.

Referring to FIG. 11, first, in step 80, it is judged whether the sulfate flag XSUL1 is set. When the sulfate flag XSUL1 is reset, the routine goes to step 81, where the secondary fuel injection time for $NO_x$ reduction TAUNOX is calculated using the map shown in FIG. 2. In the following step 82, TAUNOX is memorized as the secondary fuel injection time TAUS. In the following step 83, the cumulative value STAUS of the secondary fuel injection time TAUS is calculated.

Contrarily, in step 80, when the sulfate flag XSUL1 is set, the routine goes to step 84, where the basic secondary fuel injection time TAUSB is calculated using the map shown in FIG. 5. In the following step 85, the correction coefficient KSUL is calculated using the map shown in FIG. 6C. In the following step 86, the secondary fuel injection time for sulfate reduction TAUSUL is calculated (TAUSUL= TAUSB·KSUL). In the following step 87, TAUSUL is memorized as the secondary fuel injection time TAUS.

Next, the second embodiment will be explained.

Figure 12:
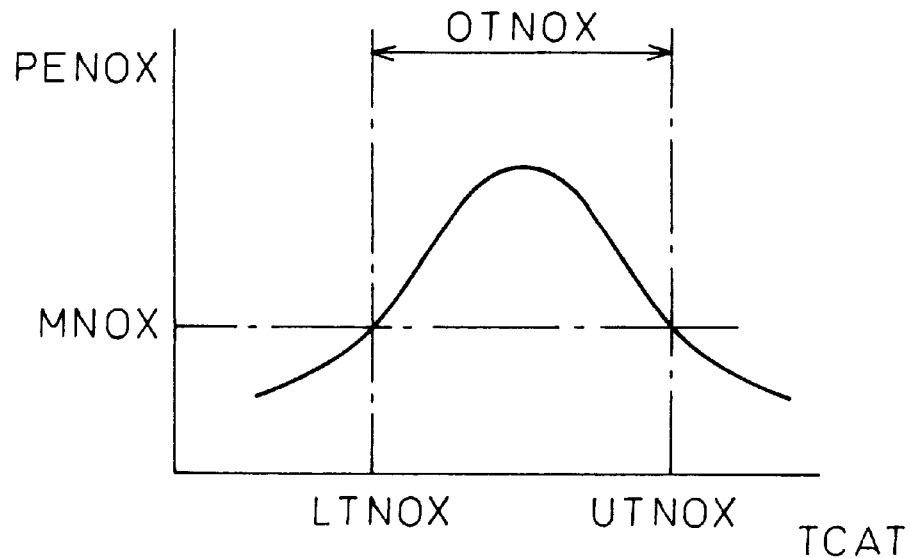
FIG. 12 shows a diagram showing relationships between the catalyst temperature TCAT and the $NO_x$ purifying efficiency PENOX.

FIG. 12 shows relationships between the $NO_x$ purifying efficiency PENOX of the catalyst 17 and the catalyst temperature TCAT. If the concentration of $NO_x$ in the exhaust gas flowing into the catalyst 17, and the concentration of $NO_x$ in the exhaust gas discharged from the catalyst 17 are represented by CNI, CNO, respectively, the $NO_x$ purifying efficiency PENOX is represented by (CNI−CNO)/CNI. Referring to FIG. 12, the efficiency PENOX is higher than the allowable minimum purifying efficiency MNOX when TCAT is within a range from LTNOX to UTNOX. If the temperature range from LTNOX to UTNOX is referred to as an optimum temperature range for $NO_x$ reduction OTNOX, when TCAT is lower than the optimum temperature range for $NO_x$ reduction OTNOX, the catalyst 17 is not activated for $NO_x$ reduction. When TCAT is higher than OTNOX, the reducing agent fed to the catalyst 17 mainly reacts with the substance other than $NO_x$, especially oxygen $O_2$, and thus the amount of reducing agent will be too little to reduce the $NO_x$. Accordingly, the $NO_x$ purifying efficiency PENOX is lower than the allowable minimum efficiency MNOX when TCAT is out of OTNOX. Contrarily, when TCAT is within OTNOX, the catalyst 17 is activated for $NO_x$ reduction and the reducing agent mainly reacts with $NO_x$ rather than oxygen $O_2$ and, thus, the $NO_x$ purifying efficiency PENOX is higher than the allowable minimum efficiency MNOX.

Therefore, the reducing agent cannot be used for $NO_x$ reduction effectively, even though the reducing agent is fed to the catalyst 17 when the catalyst temperature TCAT is out of the optimum temperature range for $NO_x$ reduction OTNOX. Thus, in the second embodiment, the secondary fuel injection for $NO_x$ reduction is performed when TCAT is within OTNOX, and is stopped when TCAT is out of OTNOX. As a result, the reducing agent can be used for $NO_x$ reduction effectively, while suppressing $NO_x$ discharged from the catalyst 17 sufficiently. Note that, in the example shown in FIG. 12, the lower threshold LTNOX and the upper threshold UTNOX of OTNOX are about 200° C. and about 350° C., respectively.

Figure 13:
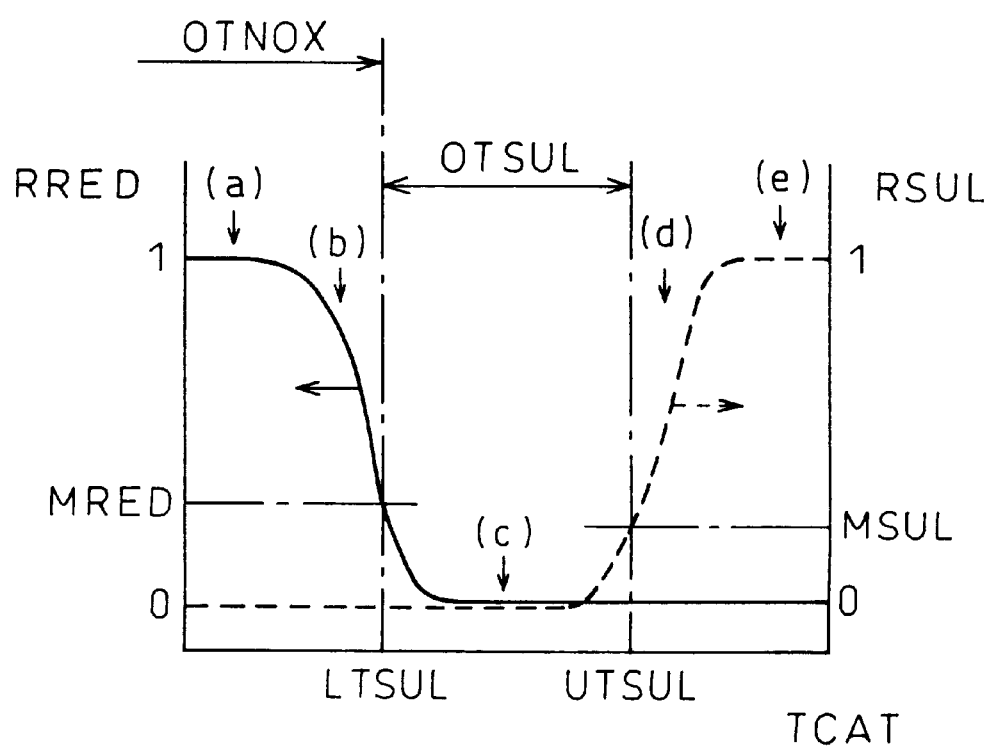
FIG. 13 shows a diagram showing relationships between the catalyst temperature TCAT, and the concentration ratio of the reducing agent RRED and the concentration ratio of sulfate RSUL.

FIG. 13 shows relationships between the catalyst temperature TCAT, and a ratio RRED between the concentrations of the reducing agent in the exhaust gas at the inlet and the outlet of the catalyst 17, and a ratio RSUL between the concentrations of sulfate in the exhaust gas at the inlet and the outlet of the catalyst 17, assuming that the exhaust gas flowing into the catalyst 17 contains no $NO_x$. In FIG. 13, the reducing agent ratio RRED is shown by the solid line, and the sulfate ratio RSUL is shown by the broken line.

Referring to FIG. 13, when the catalyst temperature TCAT is low as at the point (a), the reducing agent ratio RRED is kept at about 1.0, i.e., almost all of the reducing agent fed to the catalyst 17 is discharged from the catalyst 17 without any reactions. On the other hand, the sulfate ratio RSUL is kept at about zero, i.e., almost no sulfate is discharged from the catalyst 17. This is considered to be due to the sulfate adsorption of the catalyst 17. Namely, as mentioned above, it is considered that sulfate is adsorbed in the catalyst 17 when TCAT is low.

When the catalyst temperature TCAT becomes higher as at the point (b) shown in FIG. 13, the reducing agent ratio RRED becomes lower and, when TCAT becomes equal to or higher than LTSUL, becomes smaller than the allowable maximum ratio MRED, while the sulfate ratio RSUL is kept about zero. It is considered that this is because the reducing agent reduces sulfate and the ratio of the amount of the reducing agent reacting with sulfate to the amount of the reducing agent fed to the catalyst 17 becomes larger as TCAT becomes higher, and that the sulfate which does not react with the reducing agent is adsorbed in the catalyst 17.

When the catalyst temperature TCAT becomes higher, as at the point (c) shown in FIG. 13, both of the reducing agent ratio RRED and the sulfate ratio RSUL are kept at about zero. It is considered that this is because almost all of the reducing agent fed to the catalyst 17 reacts with almost all of sulfate in the catalyst 17. Note that, in this temperature region, the sulfate adsorbed in the catalyst 17 will be desorbed from the catalyst 17.

When the catalyst temperature TCAT becomes higher as at the point (d) shown in FIG. 13, the sulfate ratio RSUL becomes larger and, when TCAT becomes higher than UTSUL, becomes larger than the allowable maximum ratio MRED, while the reducing agent ratio RRED is kept at about zero. It is considered that this is because the reducing agent fed to the catalyst 17 reacts mainly with the substance other than sulfate, especially oxygen $O_2$ and the ratio of the amount of the reducing agent reacting with oxygen $O_2$ to the amount of the reducing agent fed to the catalyst 17 becomes higher as TCAT becomes higher.

When the catalyst temperature TCAT becomes higher as at the point (e) shown in FIG. 13, the sulfate ratio RSUL is kept at about 1.0 and the reducing agent ratio RRED is kept at about zero. It is considered that this is because almost all of the reducing agent fed to the catalyst 17 reacts with oxygen $O_2$.

Namely, if the temperature range from LTSUL to UTSUL shown in FIG. 13 is referred to as an optimum temperature range for sulfate reduction OTSUL, when the catalyst temperature TCAT is within OTSUL and the reducing agent is fed to the catalyst 17, the sulfate in the catalyst 17 is reduced and the amount of the sulfate adsorbed in the catalyst 17 becomes lower, while the amounts of the reducing agent and sulfate discharged from the catalyst 17 is sufficiently reduced. Thus, in the second embodiment, the secondary fuel injection for sulfate reduction is performed to feed the reducing agent to the catalyst 17 when TCAT is within OTSUL and the adsorbed sulfate amount SQSUL becomes larger than the predetermined amount SQ1. The secondary fuel injection for sulfate reduction is stopped when TCAT is outside OTSUL, or the adsorbed sulfate amount SQSUL is smaller than the predetermined amount SQ1. As a result, the amount of sulfate discharged from the catalyst 17 can be suppressed sufficiently, while the reducing agent can be used effectively for reducing sulfate. Further, the adsorbed sulfate amount is reduced and, thus, the catalyst 17 can surely adsorbs sulfate when TCAT becomes lower again. Therefore, the amount of sulfate discharged from the catalyst 17 can be suppressed more sufficiently. Note that, in the example shown in FIG. 13, the lower threshold LTSUL and the upper threshold UTSUL of OTSUL is about 350° C. and about 450° C.

In the second embodiment, the secondary fuel injection for sulfate reduction is stopped if the catalyst temperature TCAT leaves the optimum temperature range for sulfate reduction OTSUL, even when the sulfate still remains adsorbed in the catalyst 17. Thus, the adsorbed sulfate amount SQSUL during the secondary fuel injection for sulfate reduction must be obtained.

Figure 14:
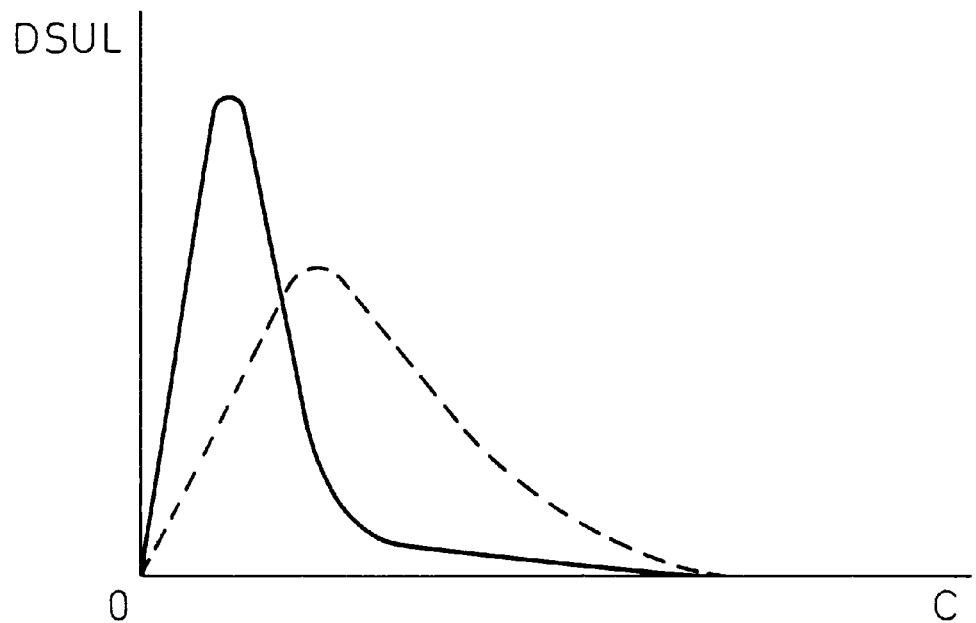
FIG. 14 shows a diagram showing the amount of sulfate desorbed from the catalyst per unit time DSUL.

FIG. 14 shows relationships between the amount of sulfate desorbed from the catalyst 17 per unit time DSUL, and the counter value C which represents the time during which the secondary fuel injection for sulfate reduction is performed. In FIG. 14, the solid line shows a case where the catalyst temperature TCAT is high, and the broken line shows a case where TCAT is low. As shown in FIG. 14, the sulfate is desorbed from the catalyst quickly after the secondary fuel injection is started when TCAT is high, and is desorbed gradually when TCAT is low. The desorbed sulfate amount per unit time DSUL is stored in the ROM 32 in advance, as a function of the counter value C and the catalyst temperature TCAT, in the form of a map as shown in FIG. 14.

Thus, the adsorbed sulfate amount SQSUL during the secondary fuel injection for sulfate reduction is expressed as follows.

SQSUL=SQSUL−DSUL·DLT

In the example shown in FIGS. 12 and 13, the upper threshold UTNOX of the optimum temperature range for $NO_x$ reduction OTNOX and the lower threshold LTSUL of the optimum temperature range for sulfate reduction OTSUL are almost equal to each other. However, depending on the structure of the catalyst 17, for example, there may be a case where UTNOX>LTSUL or UTNOX<LTSUL. However, the upper threshold UTSUL of OTSUL is higher than the upper threshold UTNOX of OTNOX, and the lower threshold LTSUL of OTSUL is higher than the lower threshold LTNOX of OTNOX. Namely, OTSUL is set at the high temperature side of OTNOX.

In this way, the catalyst temperature TCAT when the secondary fuel injection for sulfate reduction is performed is higher than that when the secondary fuel injection for $NO_x$ reduction is performed. Thus, the ratio of the amount of the reducing agent reacting with oxygen $O_2$ to the amount of the reducing agent fed to the catalyst 17 when the secondary fuel injection for sulfate reduction is performed is higher than that when the secondary fuel injection for $NO_x$ reduction is performed. Therefore, if the concentration of the reducing agent CRED in the exhaust gas flowing into the catalyst 17 when the secondary fuel injection for sulfate reduction is performed is set to the same when the secondary fuel injection for $NO_x$ reduction is performed, the reducing agent may be fully oxidized before it reaches the downstream end of the catalyst 17, i.e., the reducing agent may not be fed to the entire of the catalyst 17.

On the other hand, sulfate is adsorbed in the entire catalyst 17 and, thus, $H_2SO_4$ is desorbed from the entire catalyst 17 when the secondary fuel injection for sulfate reduction is performed. Therefore, to reduce the amount of $H_2SO_4$ discharged from the catalyst 17, the reducing agent must be fed to the entire catalyst 17. Thus, in the second embodiment, the reducing agent concentration CRED when the secondary fuel injection for sulfate reduction is performed is set to be higher than that when the secondary fuel injection for $NO_x$ reduction is performed. Namely, for example, the reducing agent concentration CRED when the secondary fuel injection for $NO_x$ reduction is performed is set to about 1,000 ppmC and that when the secondary fuel injection for sulfate reduction is performed is set to about 3,000 ppmC. As a result, the reducing agent fed to the catalyst 17 for reducing sulfate can reach the downstream end of the catalyst 17, without being fully oxidized in the upstream side of the catalyst 17 and, therefore, the reducing agent can be fed to the entire catalyst 17.

Figure 15:
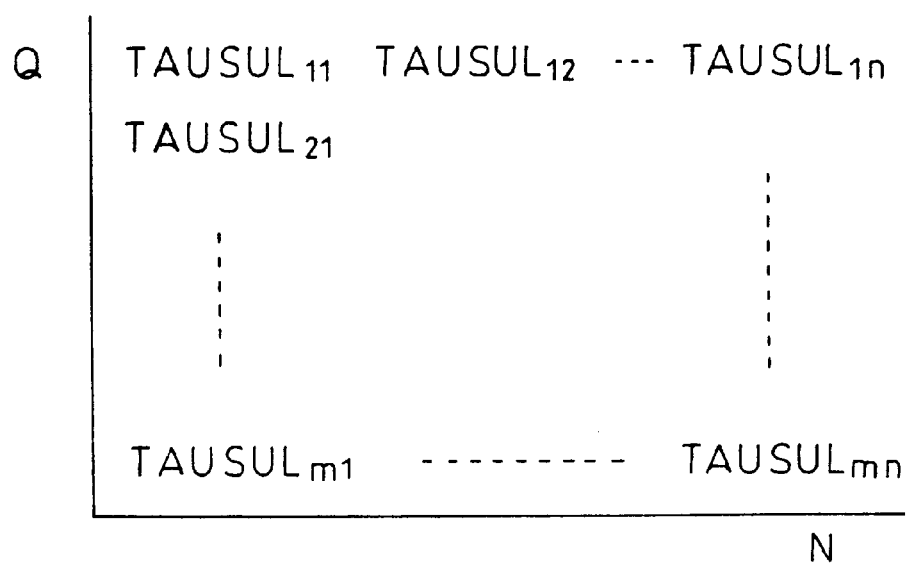
FIG. 15 shows a diagram showing the secondary fuel injection time for sulfate reduction TAUSUL.

More specifically, the secondary fuel injection time for $NO_x$ reduction TAUNOX and the secondary fuel injection time for sulfate reduction TAUSUL are predetermined so that the reducing agent concentration CRED when the secondary fuel injection for sulfate reduction is performed is set to be higher than that when the secondary fuel injection for $NO_x$ reduction is performed. Namely, in the second embodiment, TAUNOX is stored in the ROM 32 in advance, in the form of a map as shown in FIG. 2, and TAUSUL is stored in the ROM 32 in advance, as a function of the intake air amount Q and the engine speed N, in the form of a map as shown in FIG. 15.

On the other hand, some of the fuel injected by the secondary fuel injection into the combustion chamber 2 is partly or fully oxidized in the combustion chamber 2 or the exhaust passage upstream of the catalyst 17. In this case, when the secondary fuel injection timing is retarded, the amount of fuel oxidized in the combustion chamber 2 or the exhaust passage becomes smaller, or the degree of oxidization of fuel becomes lower. In other words, if the secondary fuel injection timing is retarded, the amount of the reducing agent oxidized before flowing into the catalyst 17 is suppressed and, thus, the reducing agent concentration CRED can be kept higher. At the same time, the heavy reducing agent (HC of high molecular weight) can be fed to the catalyst 17. This enables the reducing agent to reach the downstream end of the catalyst 17. Contrarily, when $NO_x$ must be reduced, it is unnecessary for the reducing agent to be fed to the entire catalyst 17. Rather, a light reducing agent (HC of small molecular weight) is more suitable to reduce $NO_x$. Therefore, in the second embodiment, the secondary fuel injection timing for sulfate reduction CASUL is set to be retarded with respect to the secondary fuel injection timing for $NO_x$ reduction CANOX. Namely, CANOX is set in a range from about 90° crank angle (CA) after the top-dead-center of the compression stroke (ATDC) to about ATDC 120° CA, and CASUL is set in a range from about ATDC 150° CA to about ATDC 210° CA, for example.

On the other hand, a porous material such as zeolite adsorbs HC therein, and desorbs the adsorbed HC therefrom when the temperature of the porous material becomes high. Thus, the catalyst 17 adsorbs HC therein, and desorbs the adsorbed HC therefrom when the catalyst temperature TCAT becomes high. Therefore, when TCAT is high as in a case where TCAT is within the optimum temperature range for sulfate reduction OTSUL, the adsorbed HC is desorbed from the catalyst 17. At this time, if the secondary fuel injection is performed for TAUSUL, which is obtained in accordance with the engine operating condition, the reducing agent is fed to the catalyst 17 excessively and, thus, the large concentration of the reducing agent may be discharged from the catalyst 17.

Thus, in the second embodiment, the reducing agent concentration CRED is set to keep the concentration of the reducing agent in the exhaust gas discharged from the catalyst 17 lower than the allowable value, when the secondary fuel injection for sulfate reduction is performed.

Namely, the amount of the reducing agent discharged from the catalyst 17 depends on the amounts of the reducing agent desorbed from the catalyst 17 and of the reducing agent fed by the secondary fuel injection, and on the reaction efficiency of the reducing agent in the catalyst 17. The reaction efficiency of the reducing agent in the catalyst 17 depends on the catalyst temperature TCAT. The amount of the reducing agent desorbed from the catalyst 17 depends on the amount of the reducing agent adsorbed in the catalyst 17 and on TCAT, and the amount of the reducing agent adsorbed in the catalyst 17 depends on the history of the engine operating condition. Thus, if the secondary fuel injection time required for making the concentration of the reducing agent in the exhaust gas discharged from the catalyst 17 equal to the allowable value is referred to as an allowable maximum secondary fuel injection time MTAU, it is possible to obtain the allowable maximum secondary fuel injection time MTAUS from TCAT and the history of the engine operating condition. Therefore, the concentration of the reducing agent in the exhaust gas discharged from the catalyst 17 will not exceed the allowable value, if the secondary fuel injection time for sulfate reduction is set not to exceed the allowable maximum secondary fuel injection time MTAUS.

Accordingly, in the second embodiment, first, the allowable maximum secondary fuel injection time MTAUS is calculated on the basis of the catalyst temperature TCAT and the history of the engine operating condition. Then, the secondary fuel injection time for sulfate reduction is set to TAUSUL when TAUSUL, which is obtained on the basis of the engine operating condition, is smaller than MTAUS, and is set to MTAUS when TAUSUL is larger than MTAUS.

Note that a sensor for detecting the concentration of the reducing agent in the exhaust gas may be arranged in the exhaust pipe 19 and the secondary fuel injection time for sulfate reduction may, alternatively, be controlled in accordance with the output signals of the sensor.

As mentioned above, the air-fuel mixture is burned with excess air in the engine and, thus, a large amount of oxygen is contained in the exhaust gas flowing into the catalyst 17. Therefore, a large amount of the reducing agent is required to make the concentration of the reducing agent in the exhaust gas high, such as 3,000 ppmC. This deteriorates the fuel consumption rate.

Thus, in the second embodiment, the opening VOP of the intake air control valve 14 is set to VOPS when the secondary fuel injection for sulfate reduction is performed, which VOPS is smaller than VOPU, which is the opening of the intake air control valve 14 during the usual engine operation, i.e., when the secondary fuel injection for sulfate reduction is stopped, to thereby reduce the amount of oxygen flowing into the catalyst 17. This reduces the amount of the reducing agent required for the secondary fuel injection for sulfate reduction and, thus, prevents the deterioration of the fuel consumption rate.

Figure 16A:
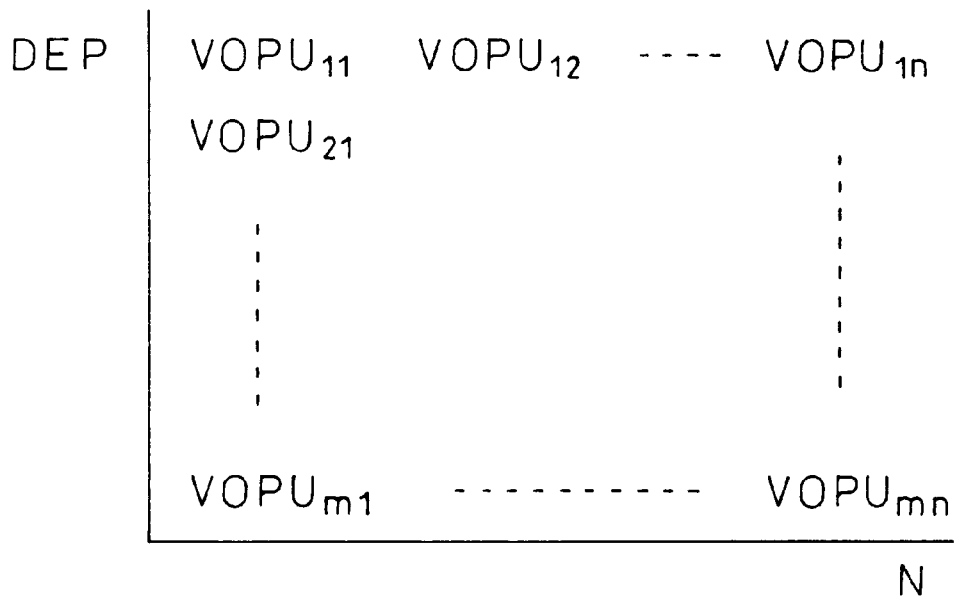
FIG. 16A shows a diagram showing the opening of the intake air control valve during the usual engine operation VOPU.
Figure 16B:
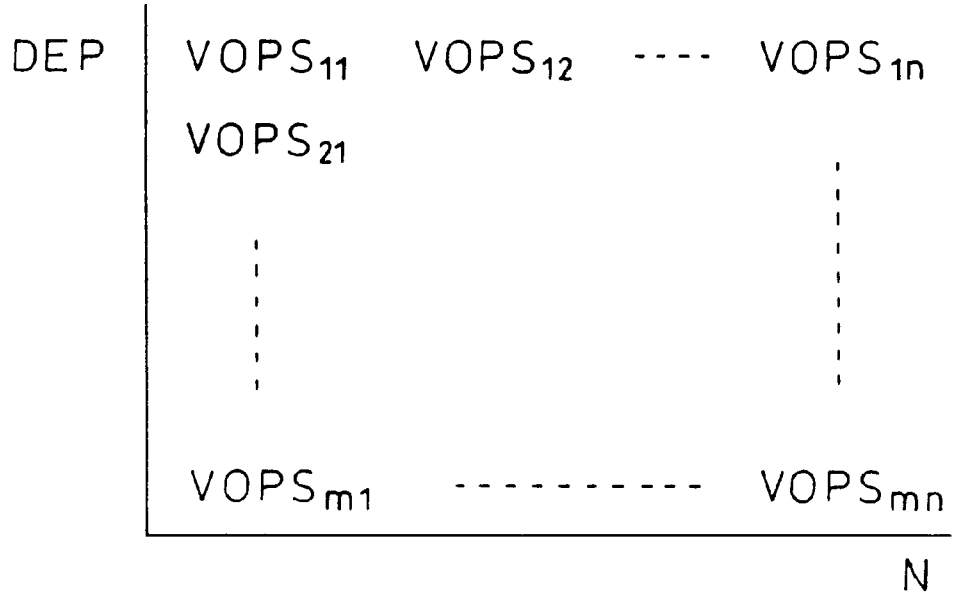
FIG. 16B shows a diagram showing the opening of the intake air control valve during the secondary fuel injection for sulfate reduction VOPS.

The opening VOPU during the usual engine operation is an opening required for making the engine output equal to the target output, and is stored in the ROM 32 in advance, as a function of the depression DEP of the acceleration pedal 42 and the engine speed N, in the form of a map as shown in FIG. 16A. The opening VOPS during the secondary fuel injection for sulfate reduction is an opening suitable for increasing the reducing agent concentration CRED without deteriorating the combustion, and is stored in the ROM 32 in advance, as a function of the depression DEP and the engine speed N, in the form of a map as shown in FIG. 16B.

Note that, in a case where the engine is provided with the EGR system, the amount of oxygen in the exhaust gas flowing into the catalyst 17 may be reduced by increasing the amount of the EGR gas, alternatively.

Figure 17:
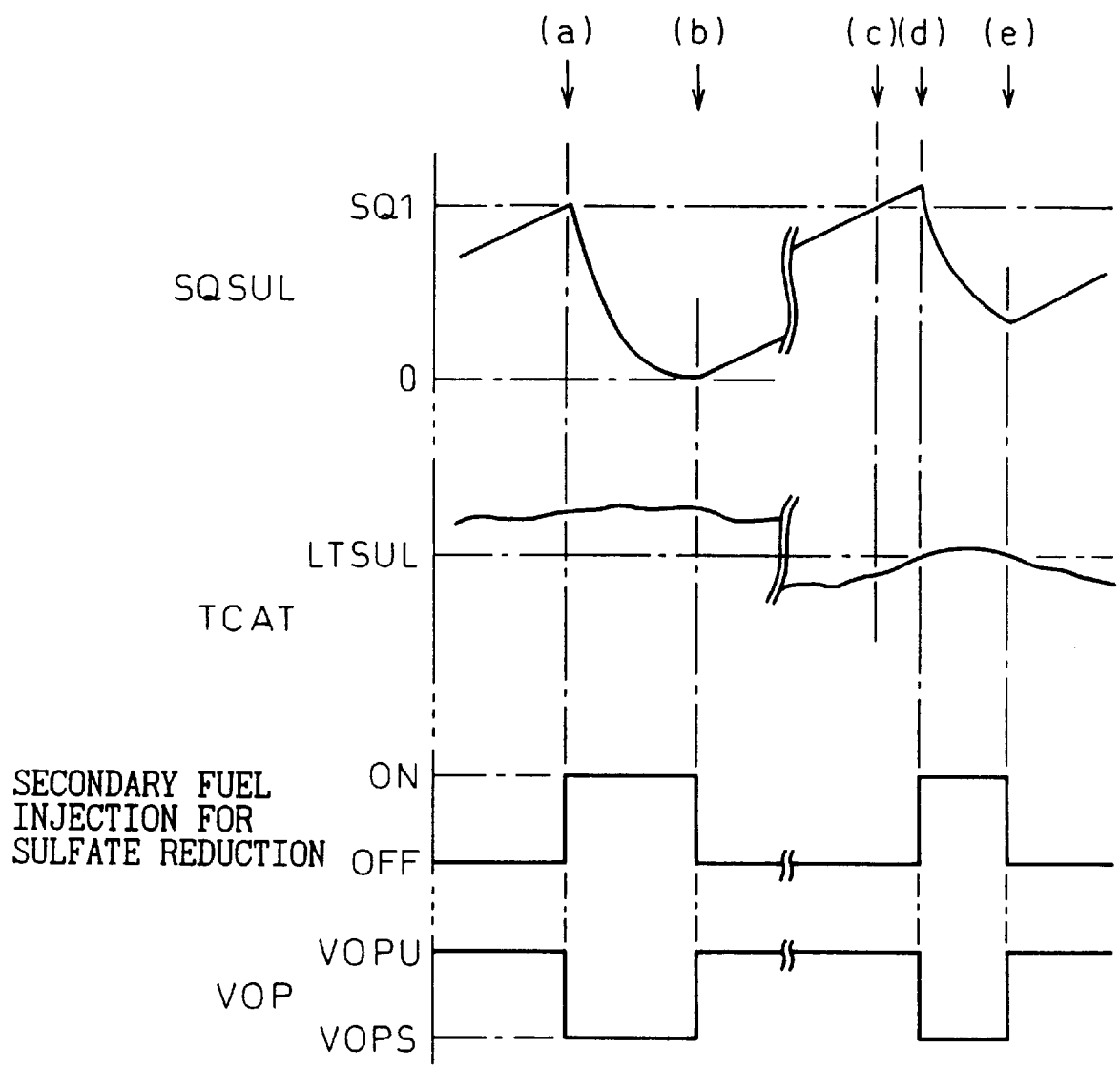
FIG. 17 shows a time chart for explaining the second embodiment of the present invention.

FIG. 17 shows a time chart for explaining the second embodiment. At the time (a) shown in FIG. 17, the absorbed sulfate amount SQSUL becomes larger than the predetermined amount SQ1. At this time, if the catalyst temperature TCAT is within the optimum temperature range for sulfate reduction OTSUL, the secondary fuel injection for sulfate reduction is started (ON) and the opening VOP of the intake air control valve 14 is reduced from VOPU to VOPS. Thus, SQSUL is reduced. As long as TCAT is kept within OTSUL, the secondary fuel injection for sulfate reduction is continued and VOP is kept at VOPS. As at the time (b), when SQSUL becomes zero, the secondary fuel injection for sulfate reduction is stopped (OFF) and VOP is increased from VOPS to VOPU.

As at the time (c), when SQSUL becomes larger than SQ1 while TCAT is outside OTSUL, the secondary fuel injection for sulfate reduction is kept stopped and VOP is kept at VOPU. When TCAT becomes within OTSUL as at the time (d), the secondary fuel injection for sulfate reduction is started and VOP is turned from VOPU to VOPS. As at the time (e), when TCAT becomes outside OTSUL, the secondary fuel injection for sulfate reduction is stopped and VOP is turned from VOPS to VOPU.

Figure 18:
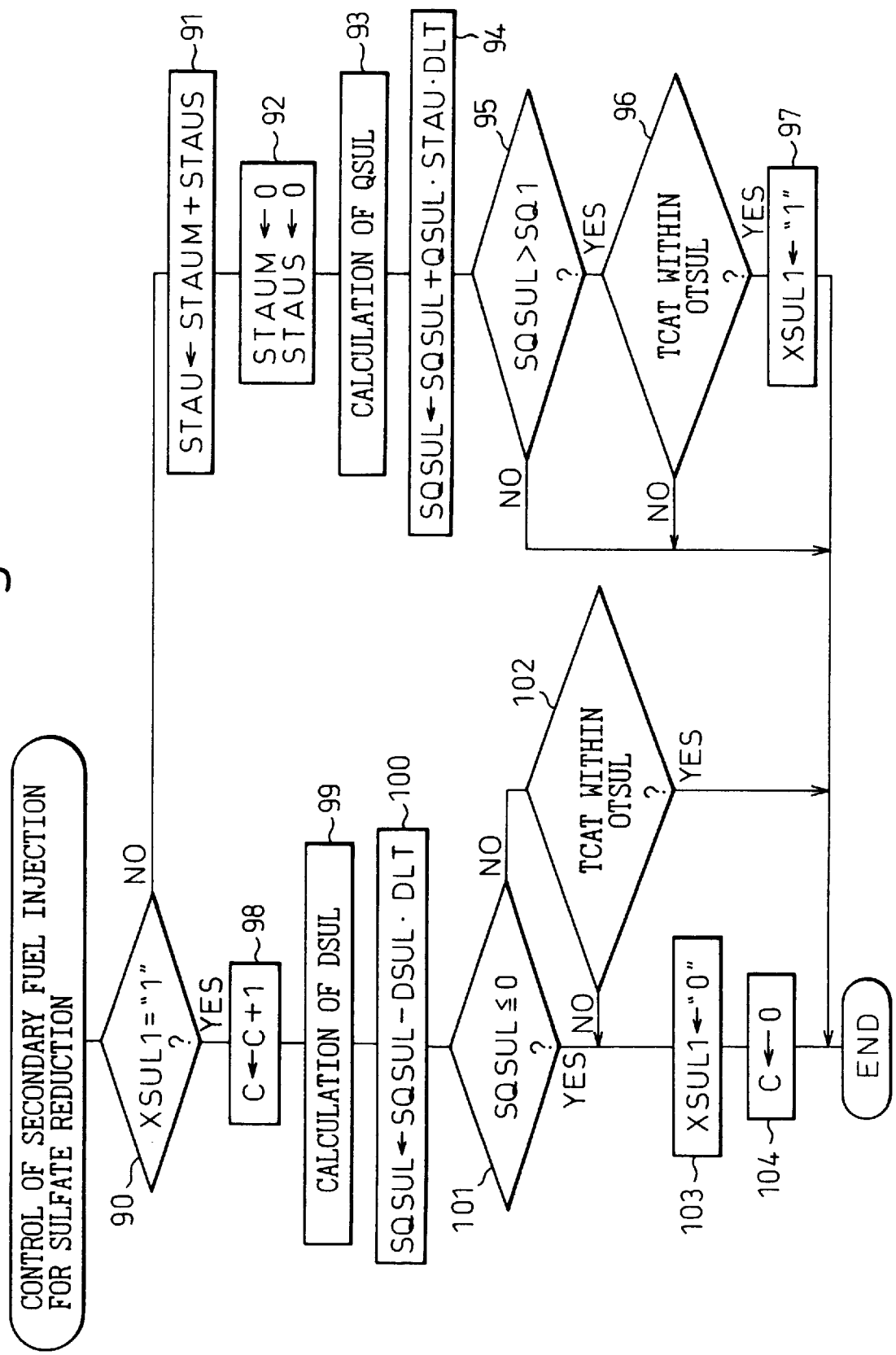
FIG. 18 shows a flowchart for controlling the secondary fuel injection for sulfate reduction according to the second embodiment.

FIG. 18 shows a routine for controlling the secondary fuel injection for sulfate reduction. The routine is executed by interruption every predetermined time.

Referring to FIG. 18, first, in step 90, it is judged whether the sulfate flag XSUL1 is set. When the sulfate flag XSUL1 is reset, the routine goes to step 91, where the sum STAU of the cumulative value of the main fuel injection time STAUM and the cumulative value of the secondary fuel injection time for $NO_x$ reduction STAUS is calculated. In the following step 92, STAUM and STAUS are cleared. In the following step 93, the inflowing sulfate amount QSUL is calculated using the map shown in FIG. 4C. In the following step 94, the estimated adsorbed sulfate amount SQSUL is calculated (SQSUL=SQSUL+QSUL·STAU·DLT). In the following step 95, it is judged whether the adsorbed sulfate amount SQSUL is larger than the predetermined value SQ1. If SQSUL≦SQ1, the processing cycle is ended. If SQSUL>SQ1, the routine goes to step 96, where it is judged whether the catalyst temperature TCAT is within the optimum temperature range for sulfate reduction OTSUL. If TCAT is outside OTSUL, the processing cycle is ended. If TCAT is within OTSUL, the routine goes to step 97, where the sulfate flag XSUL1 is set.

When the sulfate flag XSUL1 is set, the routine goes from step 90 to step 98, where counter value C, which represents the time during which the secondary fuel injection time is performed, is incremented by 1. In the following step 99, the desorbed sulfate amount DSUL is calculated using the map shown in FIG. 14. In the following step 100, the adsorbed sulfate amount SQSUL is calculated (SQSUL=SQSUL−DSUL·DLT). In the following step 101, it is judged whether SQSUL is smaller or equal to zero. If SQSUL>0, the routine goes to step 102, where it is judged whether TCAT is within OTSUL. If TCAT is within OTSUL, the processing cycle is ended. If TCAT is outside OTSUL, the routine goes to step 103. If SQSUL≦0 in step 101, the routine also goes to step 103. In step 103, the sulfate flag XSUL1 is reset. In the following step 104, the counter value C is cleared.

Figure 19:
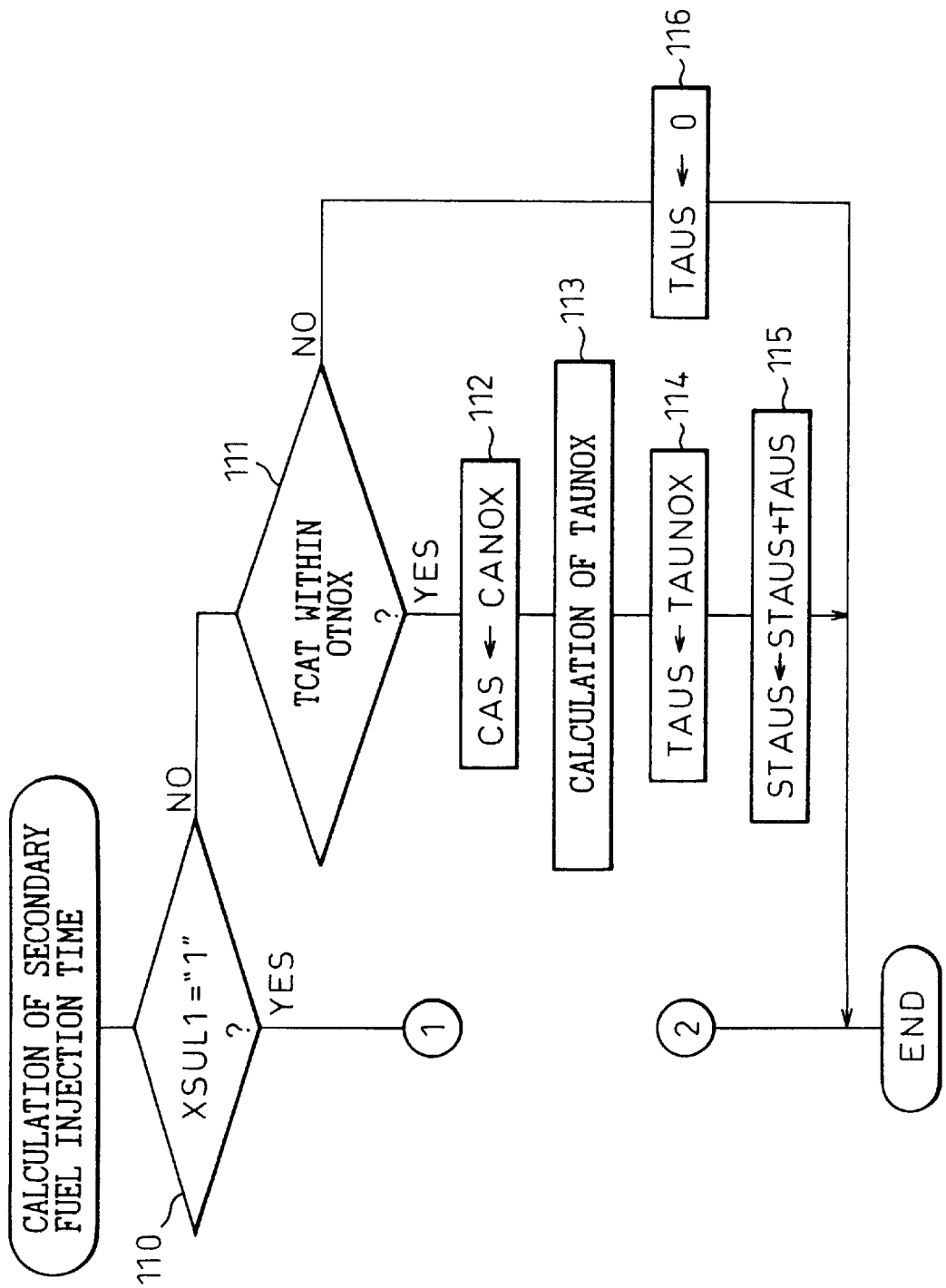
FIGS. 19 and 20 show a flowchart for calculating the secondary fuel injection time TAUS according to the second embodiment.
Figure 20:
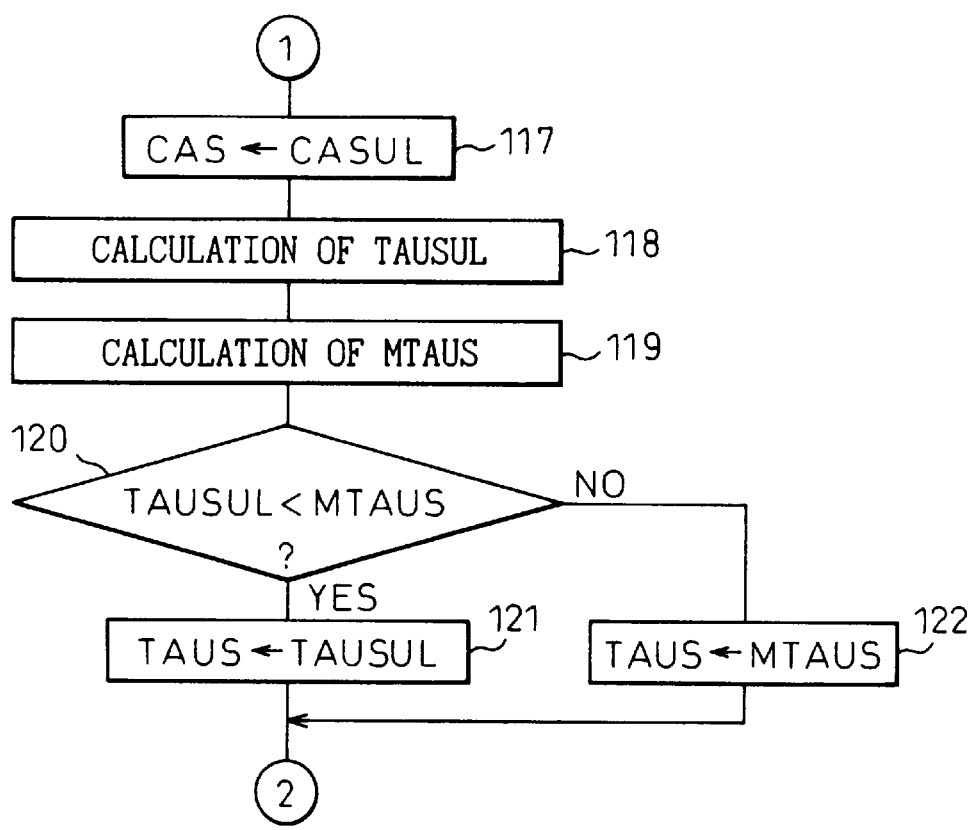

FIGS. 19 and 20 show a routine for calculating the secondary fuel injection time. The routine is executed by interruption every predetermined time.

Referring to FIGS. 19 and 20, first, in step 110, it is judged whether the sulfate flag XSUL1 is set, i.e., the adsorbed sulfate amount SQSUL is larger than the predetermined amount SQ1 and the catalyst temperature TCAT is within the optimum temperature range for sulfate reduction OTSUL.

When the sulfate flag XSUL1 is reset, the routine goes to step 111, where it is judged whether TCAT is within the optimum temperature range for $NO_x$ reduction OTNOX. When TCAT is within OTNOX, the routine goes to step 112, where the secondary fuel injection timing CAS is set to CANOX. In the following step 113, TAUNOX is calculated using the map shown in FIG. 2. In the following step 114, the secondary fuel injection time TAUS is set to the TAUNOX. Namely, when TCAT is within OTNOX, the secondary fuel injection for $NO_x$ reduction is performed. In the following step 115, the cumulative value STAUS of the secondary fuel injection time TAUS is calculated. Contrarily, when TCAT is outside OTNOX, the routine goes to step 116, where the secondary fuel injection time TAUS is set to zero. Namely, the secondary fuel injection is stopped when TCAT is outside OTSUL and OTNOX.

When the sulfate flag XSUL1 is set in step 110, the routine goes to step 117, where the secondary fuel injection timing CAS is set to CASUL. In the following step 118, TAUSUL is calculated using the map shown in FIG. 15. In the following step 119, the allowable maximum secondary fuel injection time MTAUS is calculated. In the following step 120, it is judged whether TAUSUL is larger than MTAUS. When TAUSUL<MTAUS, the routine goes to step 121, where the secondary fuel injection time TAUS is set to TAUSUL. When TAUSUL≧MTAUS, the routine goes to step 122, where TAUS is set to MTAUS. Namely, when TCAT is within OTSUL, the secondary fuel injection for sulfate reduction is performed.

Figure 21:
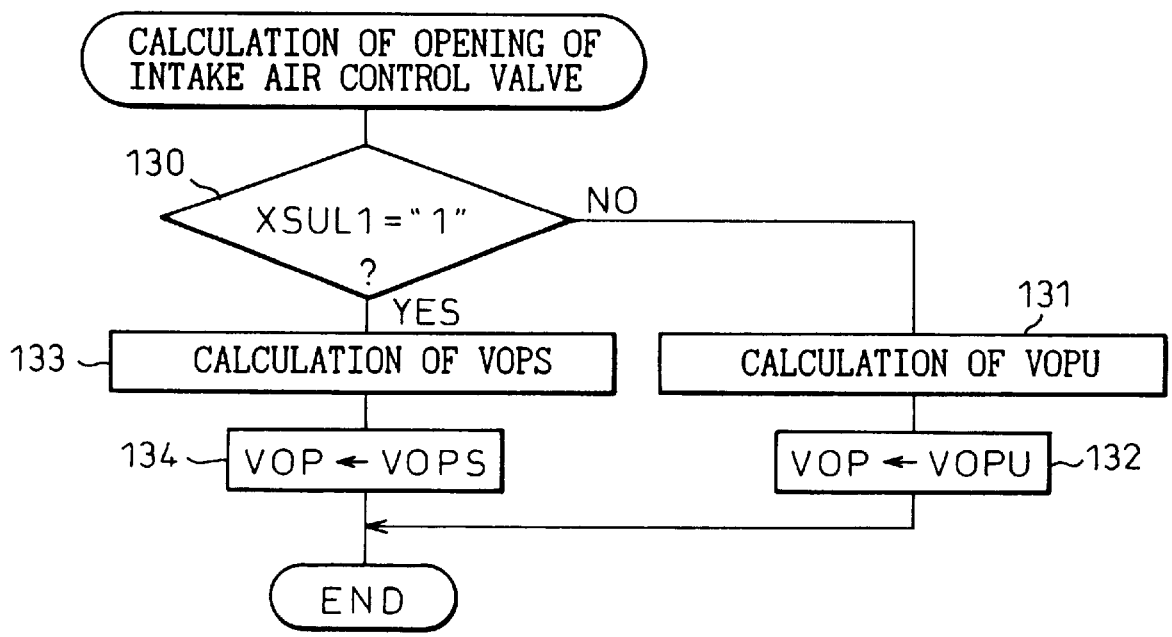
FIG. 21 shows a flowchart for calculating the opening of the intake air control valve VOP.

FIG. 21 shows a routine for calculating the opening VOP of the intake air control valve 14. The routine is executed by interruption every predetermined time.

Referring to FIG. 21, first, in step 130, it is judged whether the sulfate flag XSUL1 is set, i.e., SQSUL is larger than SQ1 and TCAT is within OTSUL. When the sulfate flag XSUL1 is reset, the routine goes to step 131, where VOPU is calculated using the map shown in FIG. 16A. In the following step 132, the valve opening VOP is set to VOPU. When the sulfate flag XSUL1 is set, the routine goes to step 133, where VOPS is calculated using the map shown in FIG. 16B. In the following step 134, the valve opening VOP is set to VOPS.

Next, the third embodiment will be explained.

In the second embodiment mentioned above, the catalyst temperature TCAT depends on the engine operating condition and, thus, the carrying out of the secondary fuel injection for sulfate reduction depends on the engine operating condition. However, if the low load operation or the idling operation of the engine is continued, the catalyst temperature TCAT is kept outside the optimum temperature range for sulfate reduction OTSUL. Thus, the adsorbed sulfate amount SQSUL increases gradually and the catalyst 17 may be saturated with sulfate. Thus, in the third embodiment, TCAT is compulsorily made to be within OTSUL by a catalyst temperature control device, when the adsorbed sulfate amount SQSUL becomes larger than the predetermined value SQ1.

If the secondary fuel injection is performed, a part of the secondary fuel is burned in the combustion chamber 2 or in the exhaust passage upstream of the catalyst 17 and, thus, the temperature of the exhaust gas flowing into the catalyst 17 becomes higher. Therefore, in the third embodiment, the secondary fuel injection at the combustion stroke or the beginning of the exhaust stroke is performed to heat the catalyst 17, to thereby make the catalyst temperature TCAT within the optimum temperature range for sulfate reduction OTSUL. When TCAT is within OTSUL, the secondary fuel injection for heating is stopped and, then, the secondary fuel injection for sulfate reduction is started.

Namely, if TCAT is within OTSUL when SQSUL becomes larger than SQ1, the secondary fuel injection for sulfate reduction is immediately started. Contrarily, if TCAT is lower than OTSUL when SQSUL becomes larger than SQ1, first, the secondary fuel injection for heating is performed and, when TCAT becomes within OTSUL, the secondary fuel injection for sulfate reduction is then started.

In the third embodiment, the cumulative amount of the secondary fuel injection time for sulfate reduction STAUSS is obtained and, when the cumulative amount STAUSS becomes larger than a set value ST1, the secondary fuel injection for sulfate reduction is stopped. The set value ST1 represents an amount of the reducing agent required for desorbing and reducing almost all of the sulfate adsorbed in the catalyst 17, and is obtained in accordance with the adsorbed sulfate amount SQSUL at the start of the secondary fuel injection for sulfate reduction. The set value ST1 is stored in the ROM 32 in advance to become larger as SQSUL, at the start of the secondary fuel injection for sulfate reduction, becomes larger. As a result, the reducing agent can be used effectively to reduce the sulfate.

Figure 22:
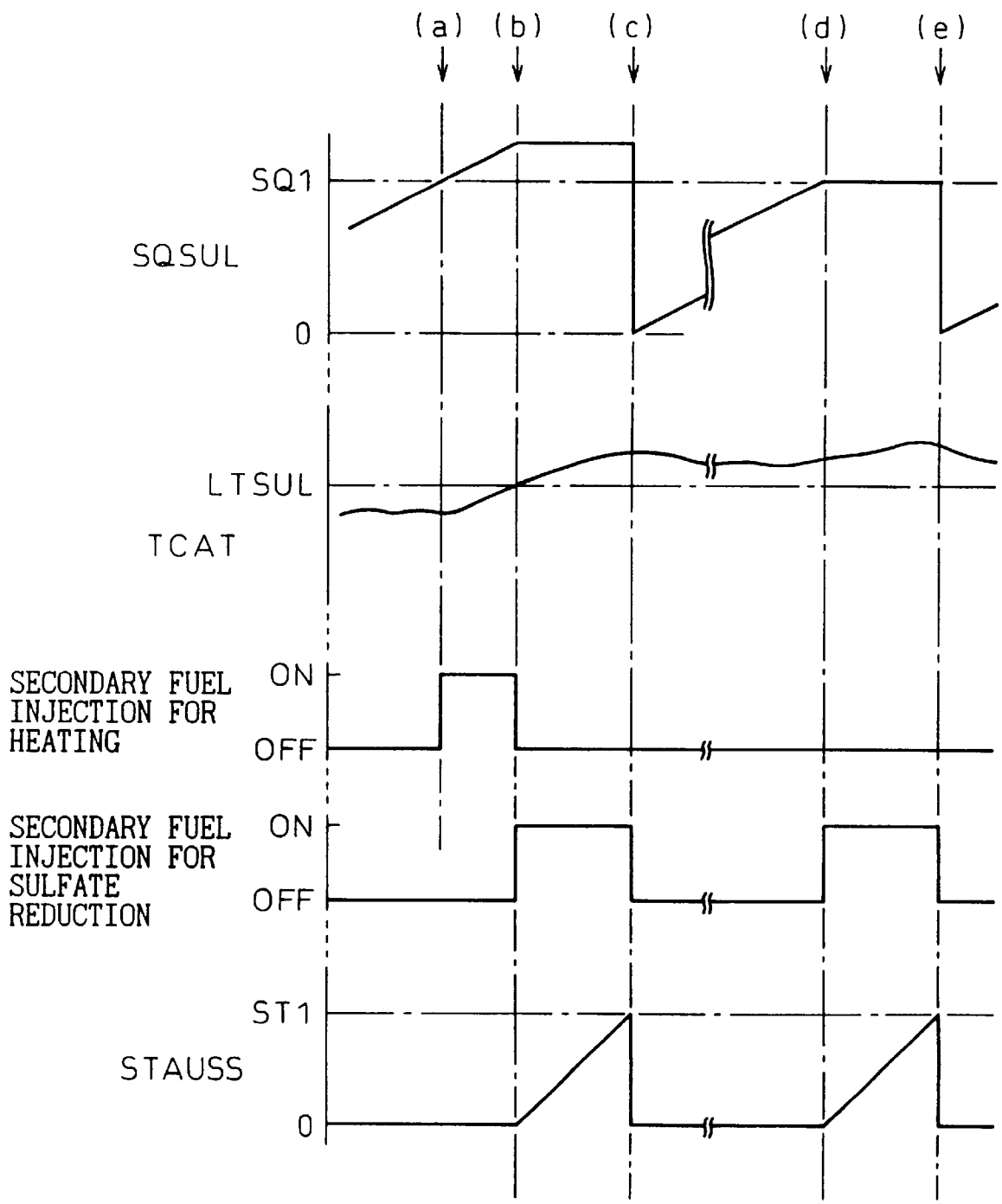
FIG. 22 shows a time chart for explaining the third embodiment of the present invention.

Next, the third embodiment will be explained in more detail with reference to FIG. 22. As at the time (a) in FIG. 22, if the catalyst temperature TCAT is lower than the optimum temperature range for sulfate reduction OTSUL when the adsorbed sulfate amount SQSUL becomes larger than the predetermined value SQ1, the secondary fuel injection for sulfate reduction is kept stopped (OFF) and the secondary fuel injection for heating is started (ON). As at the time (b), when TCAT becomes within OTSUL, the secondary fuel injection for heating is stopped (OFF) and the secondary fuel injection for sulfate reduction is started (ON). At this time, the calculation of the cumulative amount of the secondary fuel injection time for sulfate reduction STAUSS is started. As at the time (c), when the cumulative amount STAUSS becomes larger than the set value ST1, which has been obtained at the start of the calculation of STAUSS, the secondary fuel injection for sulfate reduction is stopped and the adsorbed sulfate amount SQSUL is cleared.

At the time (d), if the catalyst temperature TCAT is within OTSUL when SQSUL becomes larger than SQ1, the secondary fuel injection for sulfate reduction is started without the secondary fuel injection for heating. At the time (e), when the cumulative amount STAUSS becomes larger than ST1, the secondary fuel injection for sulfate reduction is stopped and the adsorbed sulfate amount SQSUL is cleared.

Figure 23:
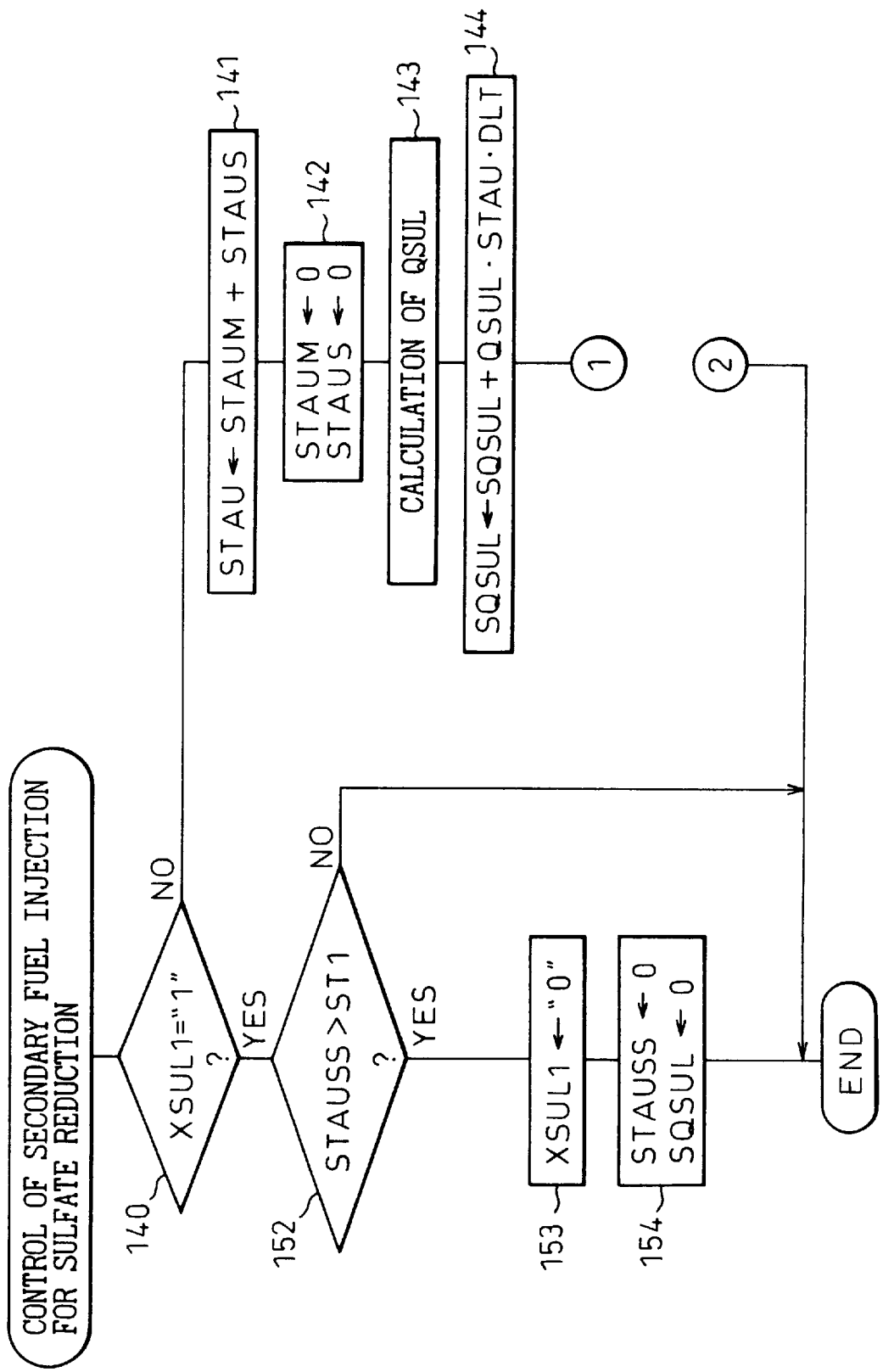
FIGS. 23 and 24 show a flowchart for controlling the secondary fuel injection for sulfate reduction according to the third embodiment.
Figure 24:
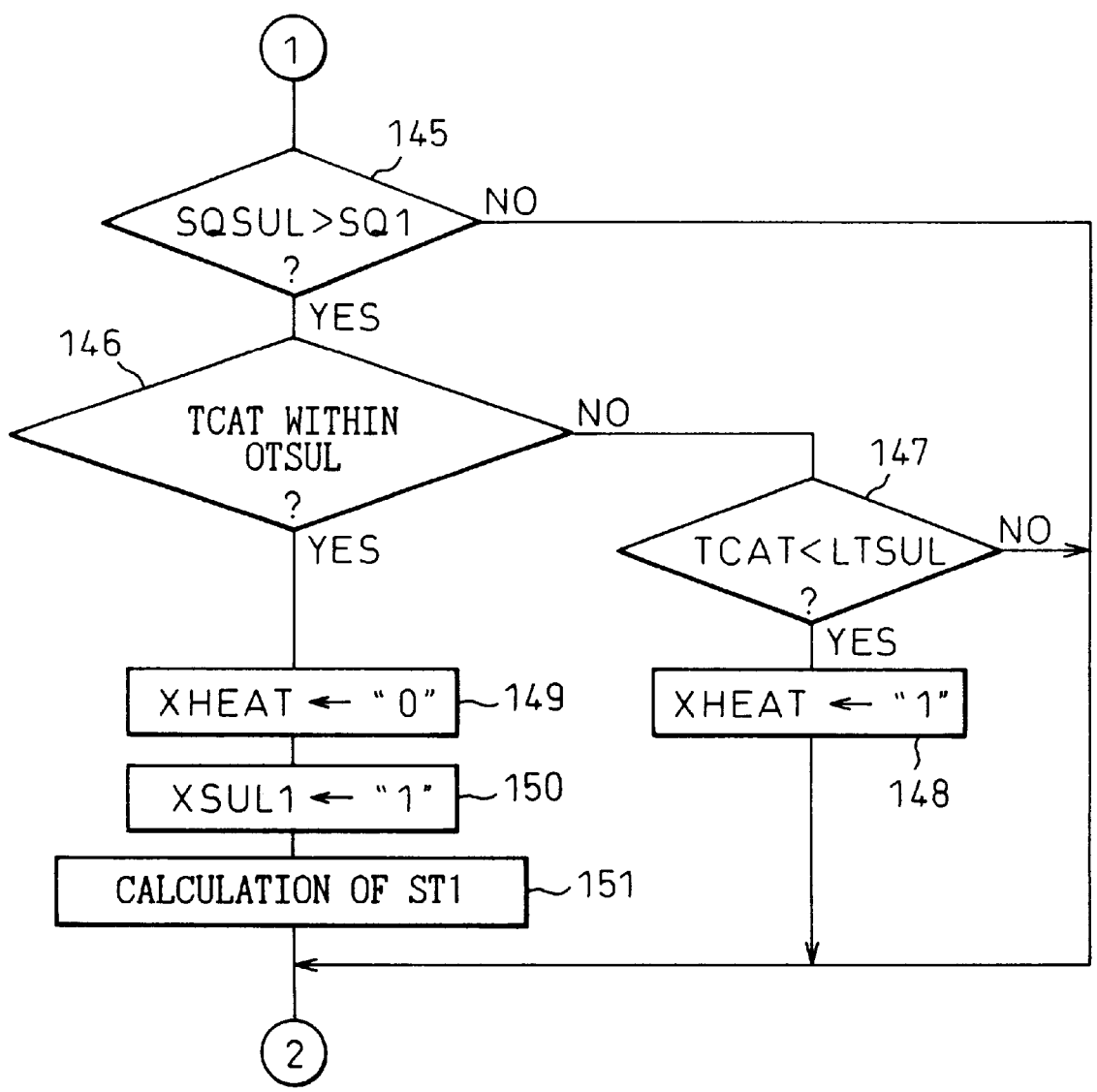

FIGS. 23 and 24 show a routine for controlling the secondary fuel injection for sulfate reduction. The routine is executed by interruption every predetermined time.

Referring to FIGS. 23 and 24, first, in step 140, it is judged whether the sulfate flag XSUL1 is set. When the sulfate flag XSUL1 is reset, the routine goes to step 141, where the sum STAU of the cumulative value of the main fuel injection time STAUM and the cumulative value of the secondary fuel injection time for $NO_x$ reduction STAUS is calculated. In the following step 142, STAUM and STAUS are cleared. In the following step 143, the inflowing sulfate amount QSUL is calculated using the map shown in FIG. 4C. In the following step 144, the estimated adsorbed sulfate amount SQSUL is calculated (SQSUL=SQSUL+QSUL·STAU·DLT). In the following step 145, it is judged whether the adsorbed sulfate amount SQSUL is larger than the predetermined value SQ1. If SQSUL≦SQ1, the processing cycle is ended. If SQSUL>SQ1, the routine goes to step 146, where it is judged whether the catalyst temperature TCAT is within the optimum temperature range for sulfate reduction OTSUL. If TCAT is outside OTSUL, the routine goes to step 147, where it is judged whether TCAT is lower than the lower threshold LTSUL of OTSUL. If TCAT>LTSUL, i.e., TCAT is higher than OTSUL, the processing cycle is ended. If TCAT<LTSUL, i.e., TCAT is lower than OTSUL, the routine goes to step 148, where the heating flag XHEAT is set (XHEAT="1"). The heating flag XHEAT is set when the secondary fuel injection for heating must be performed and is reset (XHEAT="0") when the secondary fuel injection for heating must be stopped.

If TCAT is within OTSUL in step 146, the routine goes to step 149, where the heating flag XHEAT is turned or kept to be reset. In the following step 150, the sulfate flag XSUL1 is set. In the following step 151, the set value ST1 is calculated.

When the sulfate flag XSUL1 is set, the routine goes from step 140 to step 152, where it is judged whether the cumulative amount of the secondary fuel injection time for sulfate reduction STAUSS, which is calculated in the routine explained hereinafter, is larger than the set value ST1. If STAUSS≦ST1, the processing cycle is ended. If STAUSS>ST1, the routine goes to step 153, where the sulfate flag XSUL1 is reset. In the following step 154, the cumulative amount STAUSS and the adsorbed sulfate amount SQSUL are cleared.

Figure 25:
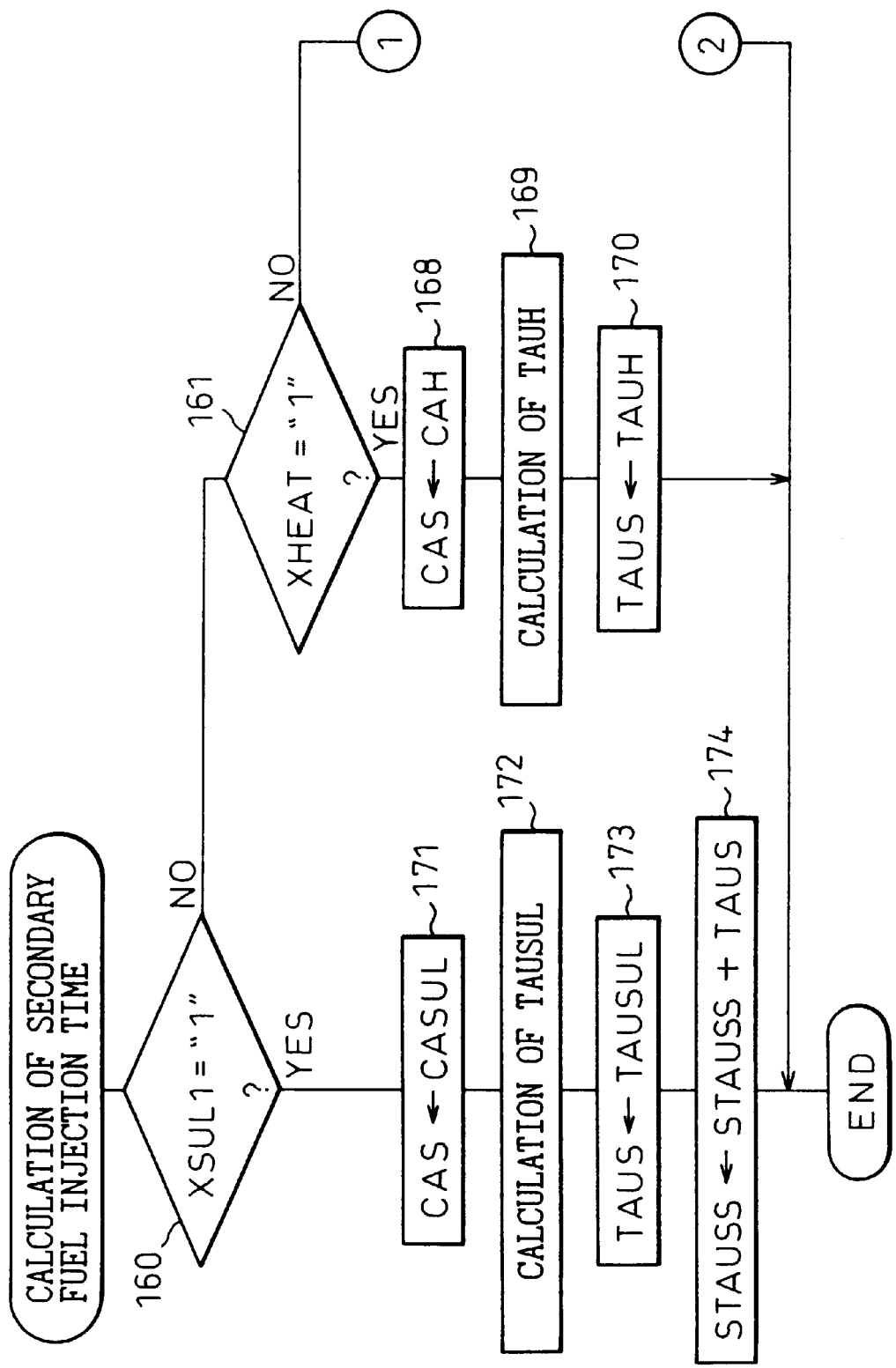
FIGS. 25 and 26 show a flowchart for calculating the secondary fuel injection time TAUS according to the third embodiment.
Figure 26:
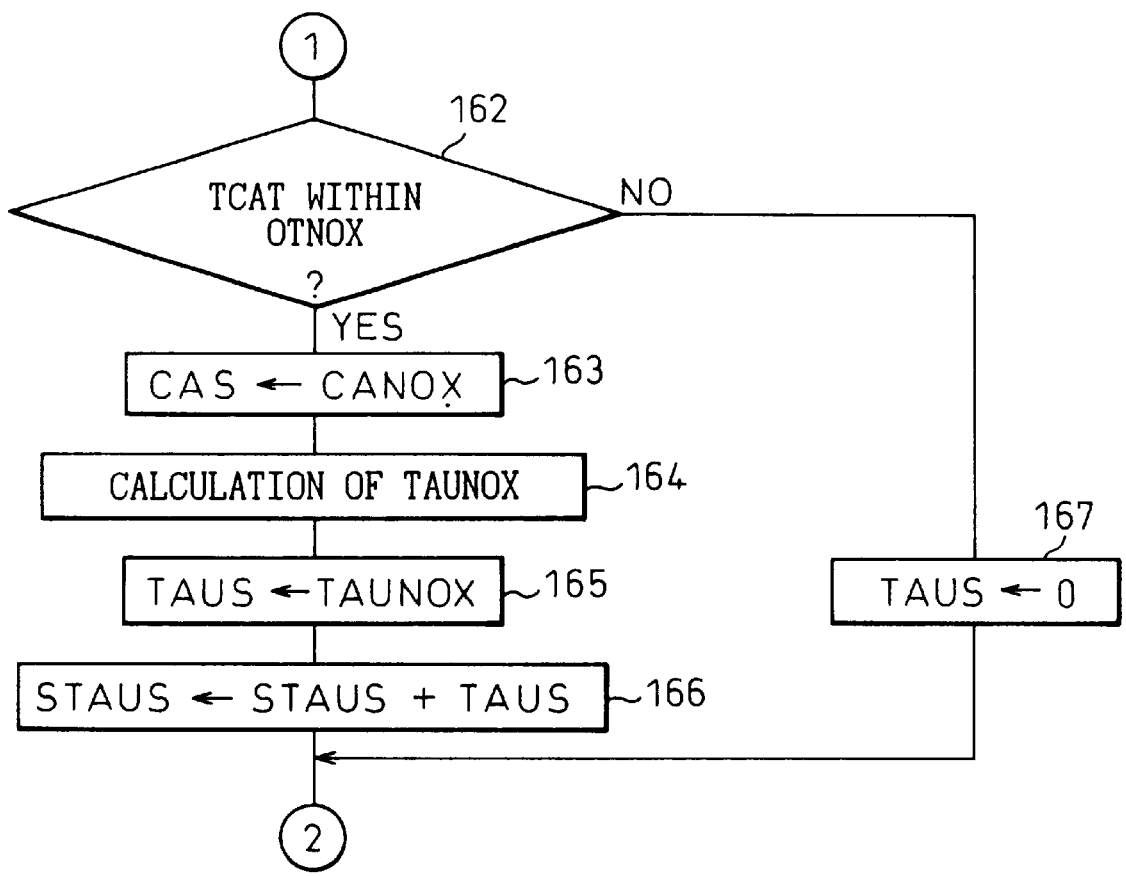

FIGS. 25 and 26 show a routine for calculating the secondary fuel injection time. The routine is executed by interruption every predetermined time.

Referring to FIGS. 25 and 26, first, in step 160, it is judged whether the sulfate flag XSUL1 is set. When the sulfate flag XSUL1 is reset, the routine goes to step 161, where it is judged whether the heating flag XHEAT is set. When the heating flag XHEAT is reset, the routine goes to step 162, where it is judged whether the catalyst temperature TCAT is within the optimum temperature range for $NO_x$ reduction OTNOX. When TCAT is within OTNOX, the routine goes to step 163, where the secondary fuel injection timing CAS is set to CANOX. In the following step 164, TAUNOX is calculated using the map shown in FIG. 2. In the following step 165, the secondary fuel injection time TAUS is set to the TAUNOX. In the following step 166, the cumulative value STAUS of the secondary fuel injection time TAUS is calculated. Contrarily, when TCAT is outside OTNOX, the routine goes to step 167, where the secondary fuel injection time TAUS is set to zero.

Figure 27:
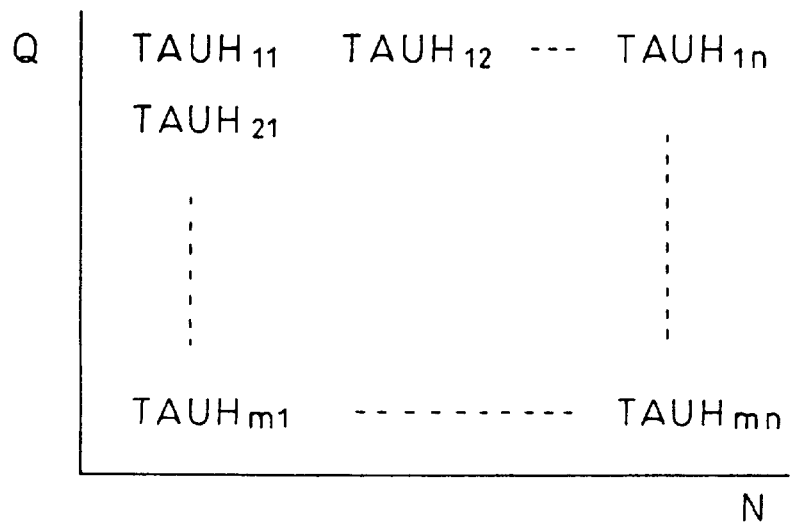
FIG. 27 shows a diagram showing the secondary fuel injection time for heating TAUH.

When the heating flag XHEAT is set in step 161, the routine goes to step 168, where CAS is set to CAH. CAH is a secondary fuel injection timing suitable for increasing the catalyst temperature TCAT quickly, and is set between about ATDC 90° CA and about ATDC 120° CA, for example. In the following step 169, the secondary fuel injection time for heating TAUH is calculated. TAUH is a secondary fuel injection time suitable for increasing the catalyst temperature TCAT quickly, and is stored in the ROM 32 in advance, as a function of the intake air amount Q and the engine speed N, in the form of a map as shown in FIG. 27. In the following step 170, TAUS is set to TAUH. Namely, the secondary fuel injection for heating is performed.

When the sulfate flag XSUL1 is set in step 160, the routine goes to step 171, where CAS is set to CASUL. In the following step 172, TAUSUL is calculated using the map shown in FIG. 15. In the following step 173, TAUS is set to TAUSUL. In the following step 174, the cumulative amount of the secondary fuel injection time for sulfate reduction STAUSS is calculated (STAUSS=STAUSS+TAUS).

Next, the fourth embodiment will be explained. The fourth embodiment is different from the above-mentioned embodiments in a point that the temperature sensor in the exhaust passage and the catalyst temperature control device are not provided. The other structure and operation of the exhaust gas purifying device are same as those of the above-mentioned embodiments, and thus the explanations thereof are omitted.

In the fourth embodiment, the catalyst temperature TCAT depends on the engine operating condition. In this case, the temperature of the exhaust gas flowing into the catalyst 17 is relative low at the steady engine operation or the slow acceleration and, thus, TCAT cannot reach the optimum temperature range for sulfate reduction OTSUL. Contrarily, during rapid acceleration, the temperature of the inflowing exhaust gas is relatively high and, thus, TCAT reaches OTSUL and is maintained within OTSUL for a certain period. However, when the temperature of the inflowing exhaust gas becomes higher, there is a delay until the catalyst temperature TCAT becomes within OTSUL.

Thus, in the fourth embodiment, first, it is judged whether the engine is rapidly accelerated, and the catalyst temperature TCAT is judged to be within the, optimum temperature range for sulfate reduction OTSUL during a second set period which starts just after a first set period has past since the rapid acceleration of the engine is detected. Namely, if the adsorbed sulfate amount SQSUL is larger than the predetermined amount SQ1, the secondary fuel injection for sulfate reduction is performed during the second set period.

On the other hand, when TCAT is judged to be outside OTSUL, it is judged whether TCAT is within the optimum temperature range for $NO_x$ reduction OTNOX. When TCAT is judged to be within OTNOX, the secondary fuel injection for $NO_x$ reduction is performed. Namely, TCAT is judged to be outside OTNOX when the intake air amount Q is lower than a set value for a set time, or when the engine speed N is lower than a set value for a set time, and, otherwise, TCAT is judged to be within OTNOX.

The reduction of sulfate generates heat. Thus, TCAT may become higher than OTSUL when the secondary fuel injection for sulfate reduction is continued. In the fourth embodiment, the temperature sensor for sensing the catalyst temperature is not provided and, thus, the secondary fuel injection is continued throughout the second set period, even when TCAT becomes higher than OTSUL. In this case, however, the reducing agent cannot be used for reducing sulfate effectively, as mentioned above.

Thus, in the fourth embodiment, the secondary fuel injection for sulfate reduction is performed intermittently when TCAT is judged to be within OTSUL. This prevents TCAT from being higher than OTSUL and, thus, ensures a good reduction of sulfate.

Next, the fourth embodiment will be explained in more detail with reference to the flowcharts shown in FIGS. 28 to 31 and the time chart shown in FIG. 32.

Figure 28:
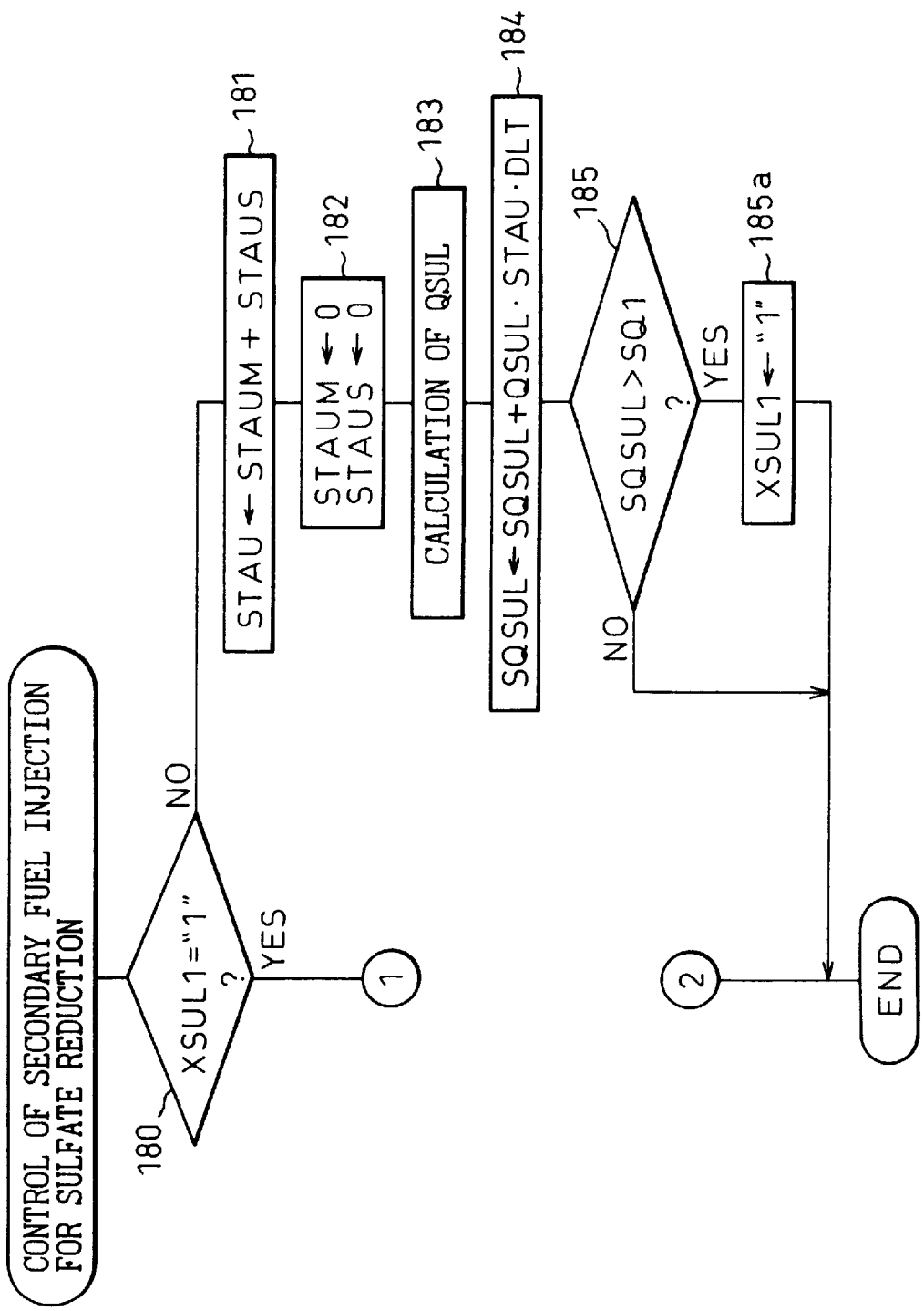
FIGS. 28 and 29 show a flowchart for controlling the secondary fuel injection for sulfate reduction according to the fourth embodiment.
Figure 29:
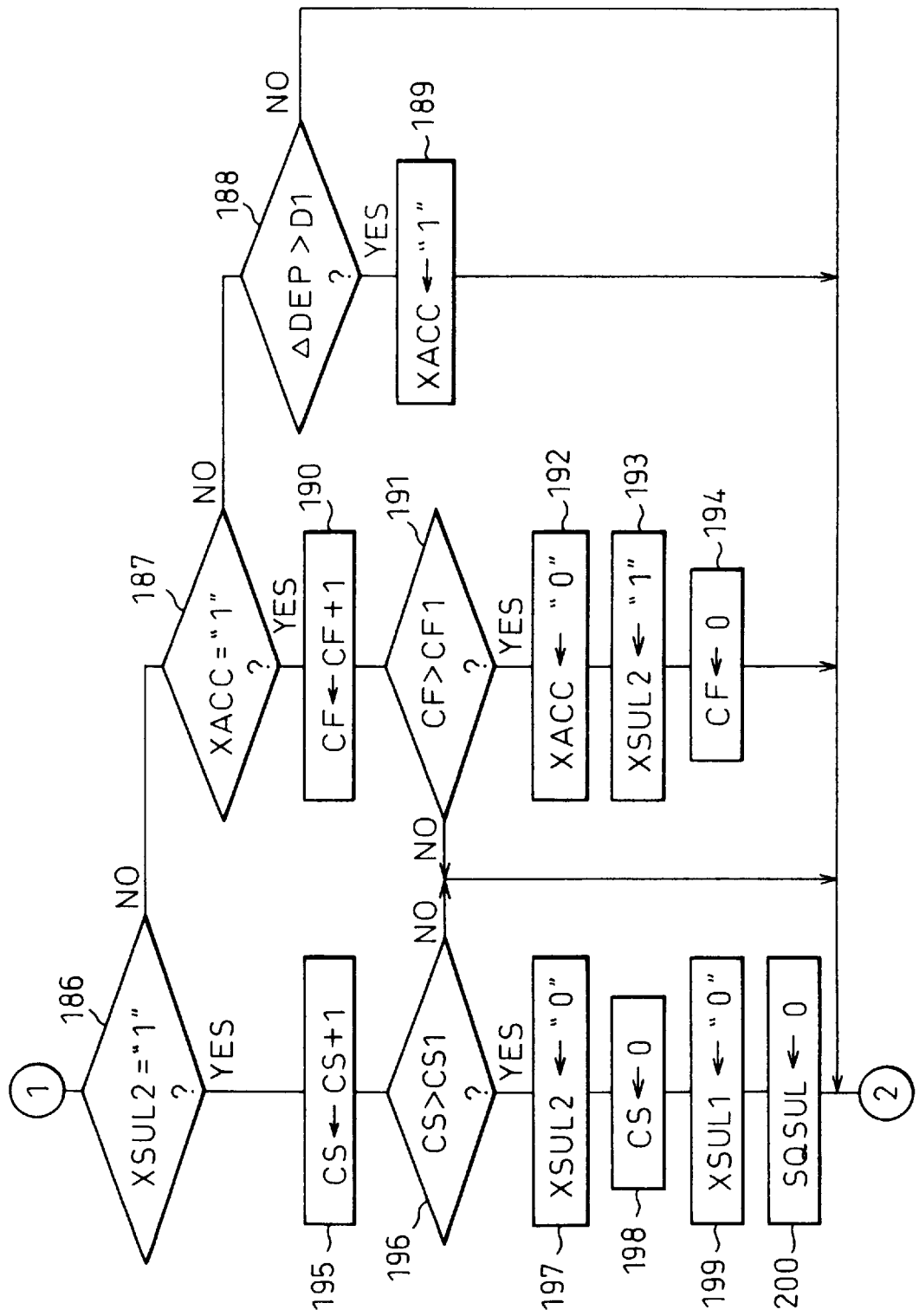

FIGS. 28 and 29 show a routine for controlling the secondary fuel injection for sulfate reduction. The routine is executed by interruption every predetermined time.

Referring to FIGS. 28 and 29, first, in step 180, it is judged whether the first sulfate flag XSUL1 is set. The first sulfate flag XSUL1 is set (XSUL1="1") when the absorbed sulfate amount SQSUL becomes larger than the predetermined amount SQ1, and is reset (XSUL1="0") when the release and reduction of sulfate is judged to be completed. When the first sulfate flag XSUL1 is reset, the routine goes to step 181, where the sum STAU of the cumulative value of the main fuel injection time STAUM and the cumulative value of the secondary fuel injection time for $NO_x$ reduction STAUS is calculated. In the following step 182, STAUM and STAUS are cleared. In the following step 183, the inflowing sulfate amount QSUL is calculated using the map shown in FIG. 4C. In the following step 184, the estimated adsorbed sulfate amount SQSUL is calculated (SQSUL=SQSUL+ QSUL·STAU·DLT). In the following step 185, it is judged whether the adsorbed sulfate amount SQSUL is larger than the predetermined value SQ1. If SQSUL≦SQ1, the processing cycle is ended. If SQSUL>SQ1, the routine goes to step 185a, where the first sulfate flag XSUL1 is set.

When the first sulfate flag is set, the routine goes from step 180 to step 186, where it is judged whether the second sulfate flag is set. The second sulfate flag XSUL2 is set (XSUL2="1") when it is judged to be during the second set period, and is reset (XSUL2="0") otherwise. When the second sulfate flag XSUL2 is reset, the routine goes to step 187, where it is judged whether the acceleration flag XACC is set. The acceleration flag XACC is set (XACC="1") when rapid acceleration of the engine is detected, and is reset (XACC="0") otherwise. When the acceleration flag XACC is reset, the routine goes to step 188, where it is judged whether the rate of change ΔDEP in the depression of the acceleration pedal DEP is larger than a set value D1 (>0), i.e., the engine is rapidly accelerated. When ΔDEP≦D1, the engine is judged not to be rapidly accelerated and the processing cycle is ended. When ΔDEP>D1, the rapid acceleration of the engine is detected and the routine goes to step 189, where the acceleration flag XACC is set.

When the acceleration flag XACC is set, the routine goes from step 187 to step 190, where the counter value CF is incremented by 1. The counter value CF represents the elapsed time from the acceleration flag XACC is set. In the following step 191, it is judged whether the counter value CF is larger than the set value CF1, which represents the first set period, mentioned above. When CF≦CF1, the processing cycle is ended. When CF>CF1, the routine goes to step 192, where the acceleration flag XACC is reset. In the following step 193, the second sulfate flag XSUL2 is set. Accordingly, the catalyst temperature TCAT is judged to be within the optimum sulfate reduction and, thus, the intermittent secondary fuel injection for sulfate reduction is started. In the following step 194, the counter value CF is cleared.

When the second sulfate flag XSUL2 is set, the routine goes from step 186 to step 195, where the counter value CS is incremented by 1. The counter value CS represents the elapsed time from the first set period is ended. In the following step 196, it is judged whether the counter value CS is larger than the set value CS1, which represents the second set period. When CS≦CS1, the processing cycle is ended. When CS<CS1, the routine goes to step 197, where the second sulfate flag XSUL2 is reset. In the following step 198, the counter value CS is cleared. At this time, the release and reduction of sulfate is judged to be completed and, in the following step 199, the first sulfate flag XSUL1 is set. In the following step 200, the adsorbed sulfate amount SQSUL is cleared.

Figure 32:
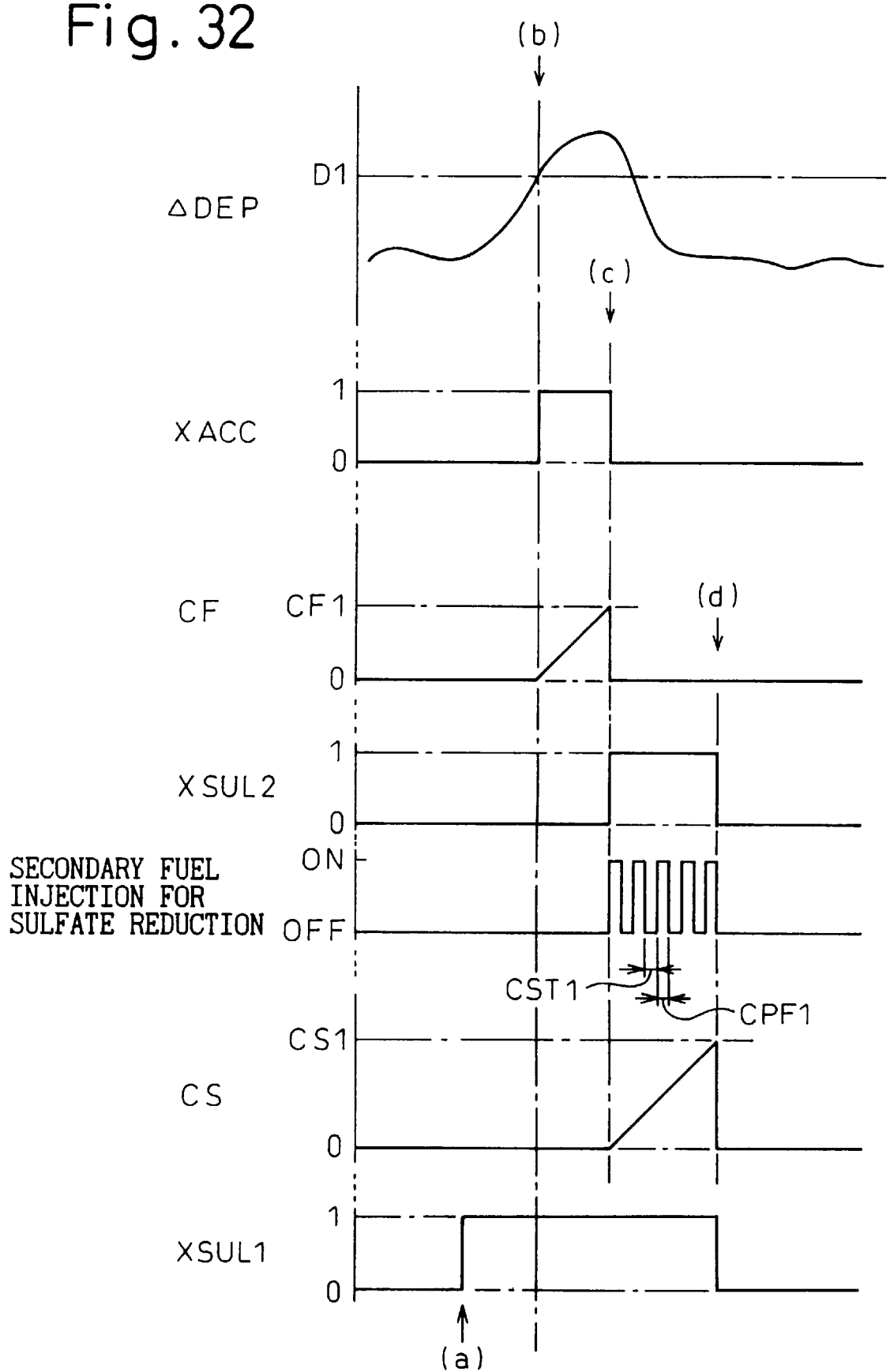
FIG. 32 shows a time chart for explaining the fourth embodiment of the present invention.

Namely, as in the time (a) shown in FIG. 32, when the adsorbed sulfate amount SQSUL becomes larger than the predetermined amount SQ1, the first sulfate flag XSUL1 is set. Then, as in the time (b), when the rate of change in the depression ΔDEP is larger than the set value D1, the acceleration flag XACC is set and the increment of the counter value CF is started. Then, as in the time (c), when the counter value CF becomes larger than the set value CF1, the acceleration flag XACC is reset, the second sulfate flag XSUL2 is set, the intermittent secondary fuel injection for sulfate reduction is started, and the increment of the counter value CS is started. Then, as in the time (d), the counter value CS becomes larger than the set value CS1, the second sulfate flag XSUL2 is reset, the secondary fuel injection for sulfate reduction is stopped, and the first sulfate flag XSUL1 is reset.

Figure 30:
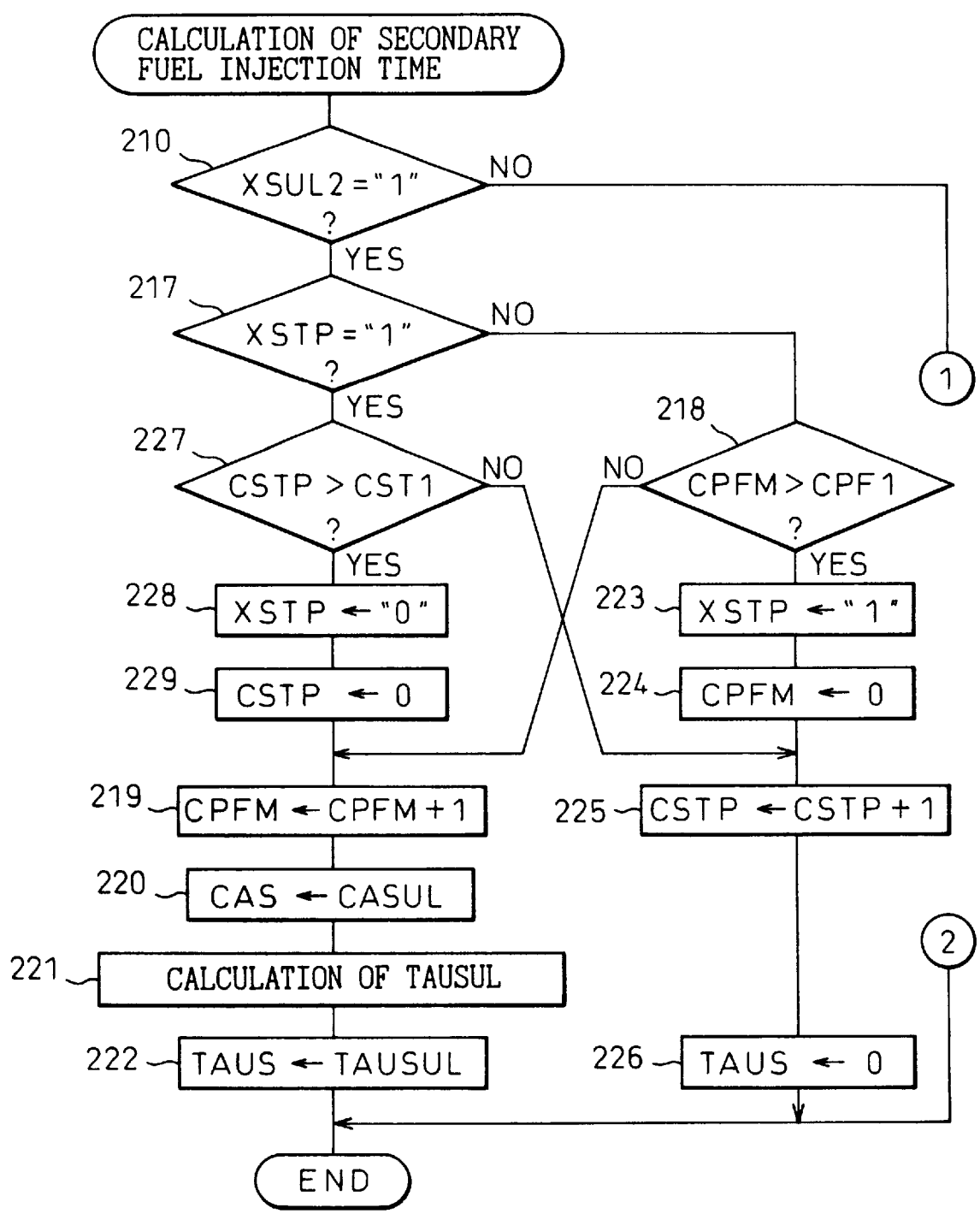
FIGS. 30 and 31 show a flowchart for calculating the secondary fuel injection time TAUS according to the fourth embodiment.
Figure 31:
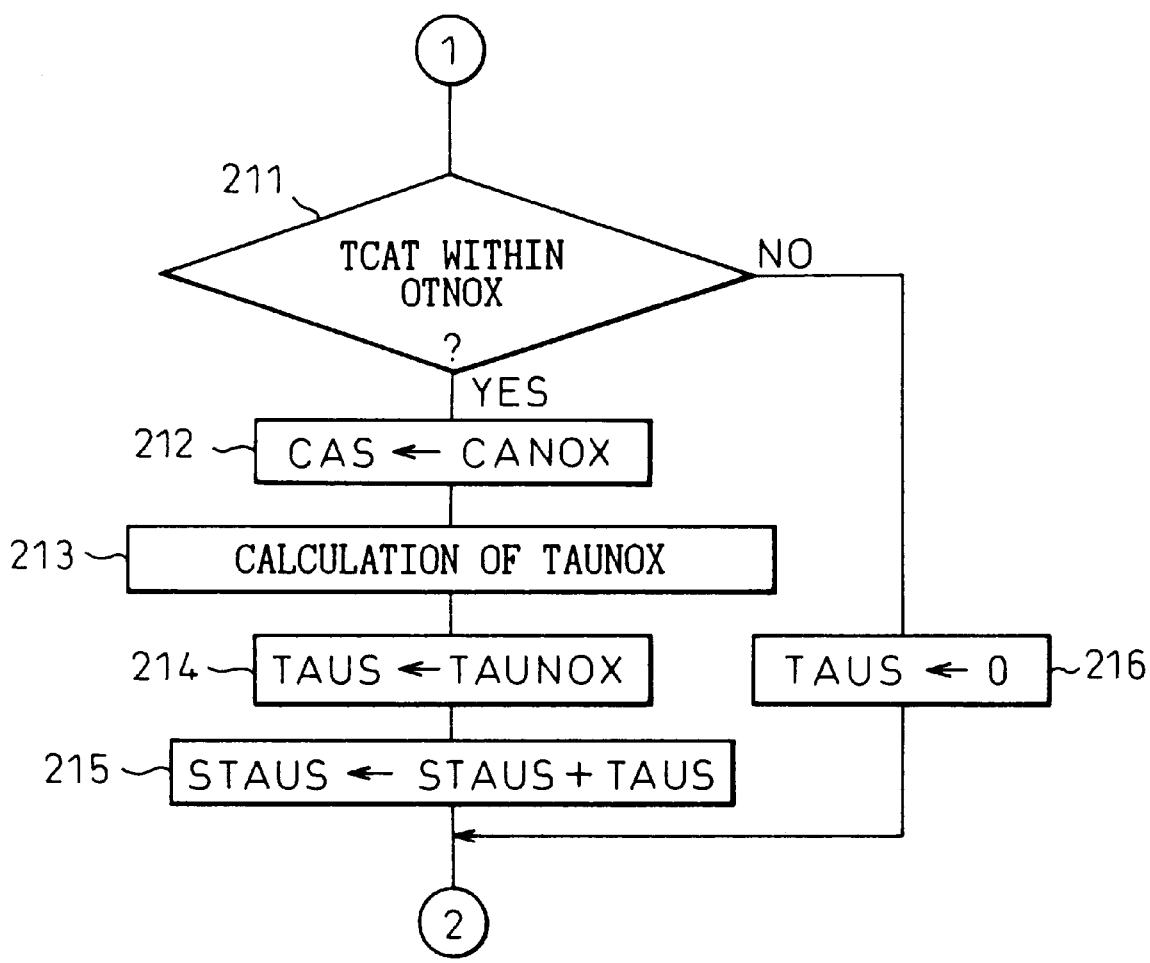

FIGS. 30 and 31 show a routine for calculating the secondary fuel injection time. The routine is executed by interruption every predetermined time.

Referring to FIGS. 30 and 31, first, in step 210, it is judged whether the second sulfate flag XSUL2 is set. When the second sulfate flag XSUL2 is reset, the routine goes to step 211, where it is judged whether the catalyst temperature TCAT is within the optimum temperature range for $NO_x$ reduction OTNOX on the basis of the engine operating condition. As mentioned above, TCAT is judged to be outside OTNOX when the intake air amount Q is smaller than the set value for the set period or the engine speed N is lower than the set value for the set period, and is judged to be within OTNOX otherwise. When TCAT is judged to be within OTNOX, the routine goes to stop 212, where the secondary fuel injection timing CAS is set to CANOX. In the following step 213, TAUNOX is calculated using the map shown in FIG. 2. In the following stop 214, the secondary fuel injection time TAUS is set to the TAUNOX. In the following step 215, the cumulative value STAUS of the secondary fuel injection time TAUS is calculated. Contrarily, when TCAT is judged to be outside OTNOX, the routine goes to step 216, where the secondary fuel injection time TAUS is set to zero.

When the second sulfate flag XSUL2 is set, the routine goes from 210 to step 217, where it is judged whether the stoppage flag XSTP is set. The stoppage flag XSTP is set (XSTP="1") when the secondary fuel injection for sulfate reduction must be stopped temporarily, and is reset (XSTP="0") when the secondary fuel injection for sulfate reduction must actually be performed. When the stoppage flag XSTP is reset, the routine goes to step 218, where it is judged whether the counter value CPFM is larger than the set value CPF1. The counter value CPFM represents the time during which the secondary fuel injection for sulfate reduction is continuously performed. When CPFM≦CPF1, the routine goes to step 219, where the counter value CPFM is incremented by 1. In the following step 220, CAS is set to CASUL. In the following step 221, TAUSUL is calculated using the map shown in FIG. 15. In the following step 222, TAUS is set to TAUSUL. Thus, the secondary fuel injection for sulfate reduction is actually performed.

When CPFM>CPF1, the routine goes step 223, where the stoppage flag XSTP is set. In the following step 224, the counter value CPFM is cleared. In the following step 225, the counter value CSTP is incremented by 1. The counter value CSTP represents the time during which the secondary fuel injection for sulfate reduction is continuously stopped. In the following step 226, TAUS is set to zero. Thus, the secondary fuel injection for sulfate reduction is temporarily stopped.

When the stoppage flag XSTP is set, the routine goes from step 217 to step 227, where it is judged whether the counter value CSTP is larger than the set value CST1. When CSTP≦CST1, the routine goes steps 225 and 226 where the secondary fuel injection for sulfate reduction is continuously stopped. When CSTP>CST1, the routine goes to step 228, where the stoppage flag XSTP is set. In the following step 229, the counter value CSTP is cleared. Then, the routine goes to steps 219 to 222, where the secondary fuel injection for sulfate reduction is performed.

Namely, as in the time (c) shown in FIG. 32, the second sulfate flag XSUL2 is set, the intermittent secondary fuel injection for sulfate reduction is started. When the secondary fuel injection for sulfate reduction is performed for the period represented by CPF1, the secondary fuel injection is stopped for the period represented by CST1. The performance and stoppage of the secondary fuel injection are repeated alternatively. As in the time (d), the second sulfate flag XSUL2 is reset and the secondary fuel injection for sulfate reduction is stopped.

Next, the fifth embodiment will be explained, with reference to FIG. 33.

Figure 33:
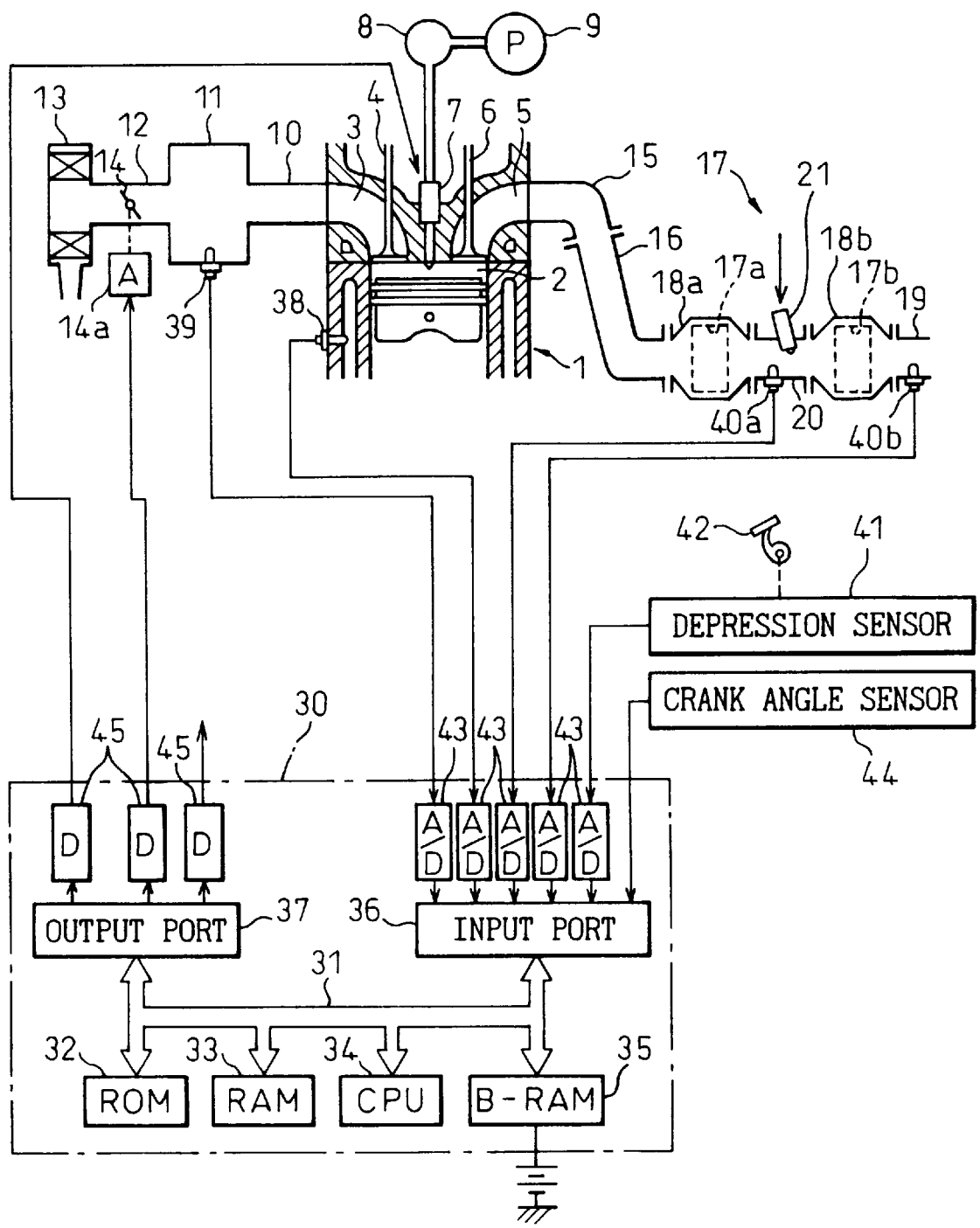
FIG. 33 is a general view of an engine according to fifth embodiment of the present invention.

Referring to FIG. 33, the catalyst 17 comprises a $NO_x$ reducing catalyst 17a and a sulfate reducing catalyst 17b connected in series. Namely, the exhaust pipe 16 is connected to the casing 18a housing the $NO_x$ reducing catalyst 17a therein, and the casing 18a is connected, via the exhaust pipe 20, to the casing 18b housing the sulfate reducing catalyst 17b therein. A reducing agent feeding device 21 for feeding the reducing agent, such as fuel, to the sulfate reducing catalyst 17b is arranged in the exhaust pipe 20. A temperature sensor 40a, which generates an output voltage in proportion to the temperature of the exhaust gas discharged from the $NO_x$ reducing catalyst 17a, is arranged in the exhaust pipe 20 adjacent to the downstream end of the $NO_x$ reducing catalyst 17a. The temperature of the exhaust gas represents the temperature of the $NO_x$ reducing catalyst 17a (it is referred to as $NO_x$ catalyst temperature, hereinafter) TCATN. Also, a temperature sensor 40b, which generates an output voltage in proportion to the temperature of the exhaust gas discharged from the sulfate reducing catalyst 17b, is arranged in the exhaust pipe 19 adjacent to the downstream end of the sulfate reducing catalyst 17b. The temperature of the exhaust gas represents the temperature of the sulfate reducing catalyst 17b (it is referred to as sulfate catalyst temperature, hereinafter) TCATS. The output voltages of the sensors 40a and 40b are input to the input port 36 of the ECU 30 via corresponding AD converters 43, respectively. On the other hand, the output port 37 of the ECU 30 is connected to the feeding device 21 via the corresponding drive circuit 45. Note that the other structure of the present embodiment is same as that of the diesel engine shown in FIG. 1, and thus the explanations thereof are omitted.

The $NO_x$ reducing catalyst 17a is comprised of a precious metal, such as platinum Pt, palladium Pd, rhodium Rh, and iridium Ir, or a transition metal, such as copper Cu, iron Fe, cobalt Co, and nickel Ni, carried on a porous carrier, such as zeolite, mordenite, ferrierite, alumina $Al_2O_3$. For zeolite, silica rich zeolite, such as ZSM-5 zeolite, may be used. The same as the catalyst 17 in the above-mentioned embodiments, the $NO_x$ reducing catalyst 17a has an optimum temperature range for $NO_x$ reduction OTNOX. Namely, the $NO_x$ reducing catalyst 17a reduces and purifies $NO_x$ with the high purifying efficiency when the $NO_x$ catalyst temperature TCATN is within OTNOX, if the reducing agent is fed to the $NO_x$ reducing catalyst 17a. However, the $NO_x$ reducing catalyst 17a does not have the sulfate adsorbing ability as that of the catalyst 17.

On the other hand, the sulfate reducing catalyst 17b is comprised of a precious metal, such as platinum Pt, palladium Pd, rhodium Rh, and iridium Ir, or a transition metal, such as copper Cu, iron Fe, cobalt Co, and nickel Ni, carried on a porous carrier, such as silica $SiO_2$, and titania $TiO_2$. The same as the catalyst 17 in the above-mentioned embodiments, the sulfate reducing catalyst 17b has a sulfate adsorbing ability and an optimum temperature range for sulfate reduction OTSUL. Namely, the sulfate reducing catalyst 17b reduces sulfate with the high purifying efficiency and the amount of sulfate adsorbed in the sulfate reducing catalyst 17b is reduced when the sulfate catalyst temperature TCATS is within OTSUL, if the reducing agent is fed to the sulfate reducing catalyst 17b. However, the sulfate reducing catalyst 17b does not have the reducing ability for $NO_x$ or the oxidizing ability of the catalyst 17. Note that the mechanism of the sulfate adsorption and the sulfate desorption and reduction of the sulfate reducing catalyst 17b is considered to be same as those in the above-mentioned catalyst 17 and, thus, the explanations thereof are omitted.

In other words, the $NO_x$ reducing catalyst 17a has the high oxidizing ability and the low sulfate adsorbing ability, and sulfate reducing catalyst 17b has the low oxidizing ability and the high sulfate adsorbing ability. Thus, in the fifth embodiment, almost all of $NO_x$ discharged from the engine is reduced in the $NO_x$ reducing catalyst 17a, and almost all of sulfate discharged from the engine is adsorbed and reduced in the sulfate reducing catalyst 17b.

Note that, in the fifth embodiment, the lower threshold LTNOX of the optimum temperature range for $NO_x$ reduction of the $NO_x$ reducing catalyst 17a is about 200° C. and the upper threshold UTNOX thereof is about 350° C. The lower threshold LTSUL of the optimum temperature range for sulfate reduction of the sulfate reducing catalyst 17b is about 350° C. and the upper threshold UTSUL thereof is about 450° C. Thus, OTSUL is set to the high temperature side with respect to OTNOX.

When the $NO_x$ catalyst temperature TCATN is within the optimum temperature range for $NO_x$ reduction OTNOX, the secondary fuel injection for $NO_x$ reduction is performed by the fuel injector 7 to feed the reducing agent to the $NO_x$ reducing catalyst 17a. When TCATN is outside OTNOX, the secondary fuel injection for $NO_x$ reduction is stopped.

Figure 34:
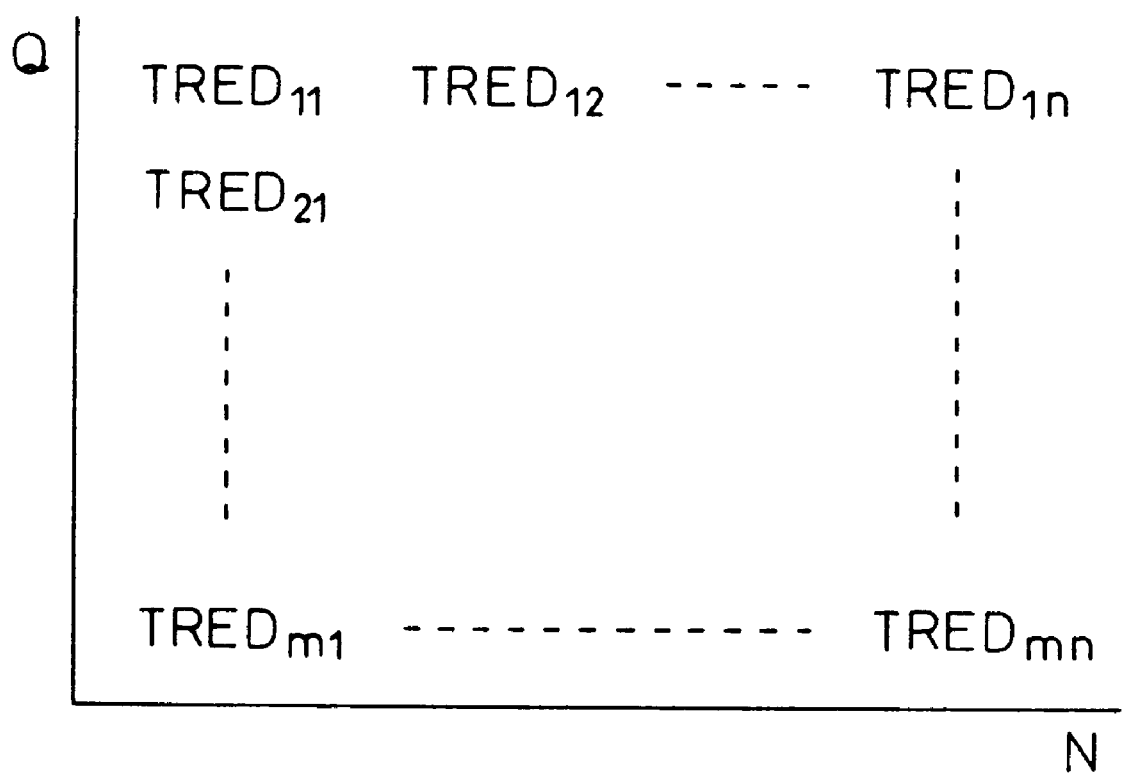
FIG. 34 shows a diagram showing the reducing agent injection time TRED.

When the absorbed sulfate amount SQSUL is larger than the predetermined amount SQ1 and the sulfate catalyst temperature TCATS is within the optimum temperature range for sulfate reduction OTSUL, the reducing agent (fuel) is injected by the feeding device 21 to the sulfate reducing catalyst 17b. In this case, the reducing agent injection time TR of the feeding device 21 is set to TRED, which corresponds to TAUSUL shown in FIG. 15 and is stored in advance in the ROM 32, as a function of the intake air amount Q and the engine speed N, in the form of a map as shown in FIG. 34. If the reducing agent for sulfate reduction is fed from the upstream of the $NO_x$ reducing catalyst 17a, such as from the fuel injector 7 in the form of the secondary fuel injection, the reducing agent is almost fully oxidized in the $NO_x$ reducing catalyst 17a due to the high oxidizing ability of the $NO_x$ reducing catalyst 17a and, thus, almost no reducing agent may reach the sulfate reducing catalyst 17b. Thus, in the fifth embodiment, the feeding device 21 is arranged between the $NO_x$ reducing catalyst 17a and the sulfate reducing catalyst 17b for feeding the reducing agent to the reducing catalyst 17b.

When SQSUL is smaller than SQ1 or TCATS is outside OTSUL, the injection of the reducing agent by the feeding device 21 is stopped.

In the fifth embodiment, the $NO_x$ reduction and the sulfate reduction are performed in the separate catalysts and, thus, the $NO_x$ reduction and the sulfate reduction may be performed at the same time. Namely, when the $NO_x$ reduction is performed in the $NO_x$ reducing catalyst 17a, the temperature of the exhaust gas flowing into the sulfate reducing catalyst 17b becomes higher than the temperature of the exhaust gas flowing into the $NO_x$ reducing catalyst 17a, because the reducing reaction of $NO_x$ generates heat. As a result, TCATN may be maintained within OTNOX and TCATS may be within OTSUL. If the adsorbed sulfate amount SQSUL is higher than the predetermined amount SQ1 at this time, the $NO_x$ reduction in the $NO_x$ reducing catalyst 17a and the sulfate reduction in the sulfate reducing catalyst 17b are performed at the same time.

Next, the fifth embodiment is explained in more detail with reference to FIGS. 35 to 37.

Figure 35:
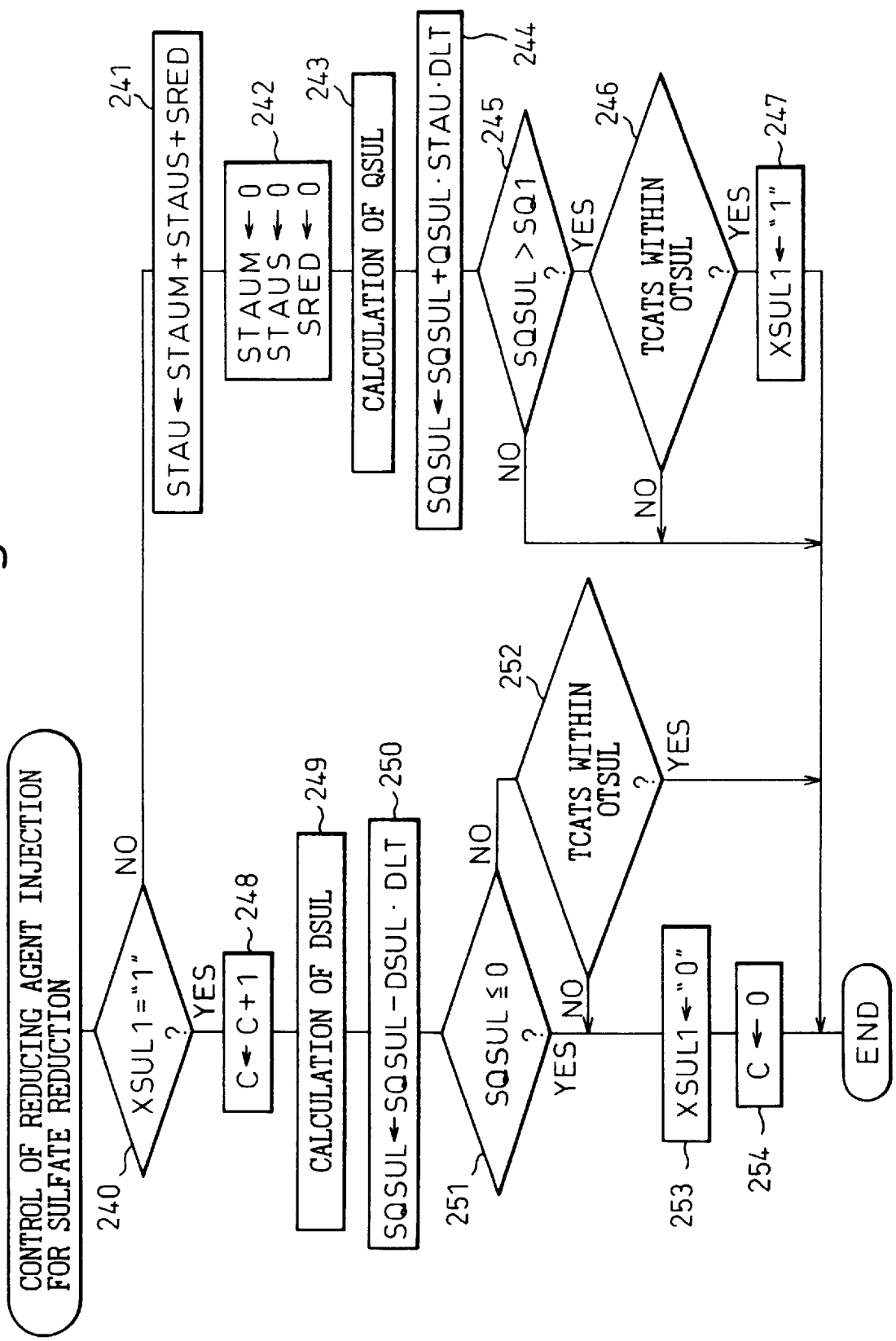
FIG. 35 shows a flowchart for controlling the reducing agent injection for sulfate reduction according to the fifth embodiment.

FIG. 35 shows a routine for controlling the reducing agent injection for sulfate reduction. The routine is executed by interruption every predetermined time.

Referring to FIG. 35, first, in step 240, it is judged whether the sulfate flag XSUL1 is set. The sulfate flag XSUL1 is set (XSUL1="1") when the adsorbed sulfate amount SQSUL becomes larger than the predetermined amount SQ1 and the sulfate catalyst temperature TCATS is within the optimum temperature range for sulfate reduction OTSUL. When the sulfate flag XSUL1 is reset, the routine goes to step 241, where the sum STAU of the cumulative value of the main fuel injection time STAUM and the cumulative value of the secondary fuel injection time for $NO_x$ reduction STAUS and the cumulative value SRED of the reducing agent injection time TR is calculated. In the following step 242, STAUM, STAUS, and SRED are cleared. In the following step 243, the inflowing sulfate amount QSUL is calculated using the map shown in FIG. 4C.

In the fifth embodiment, the amount of sulfate flowing into the sulfate reducing catalyst 17b depends on fuel fed by the main fuel injection, the secondary fuel injection for $NO_x$ reduction, and the reducing agent injection by the feeding device 21. Thus, inflowing sulfate amount QSUL is calculated on the basis of the sum of STAUM, STAUS, and SRED.

In the following step 244, the estimated adsorbed sulfate amount SQSUL is calculated (SQSUL=SQSUL+QSUL·STAU·DLT). In the following step 245, it is judged whether the adsorbed sulfate amount SQSUL is larger than the predetermined value SQ1. If SQSUL≦SQ1, the processing cycle is ended. If SQSUL>SQ1, the routine goes to step 246, where it is judged whether the sulfate catalyst temperature TCATS is within the optimum temperature range for sulfate reduction OTSUL. If TCATS is outside OTSUL, the processing cycle is ended. If TCATS is within OTSUL, the routine goes to step 247, where the sulfate flag XSUL1 is set.

When the sulfate flag XSUL1 is set, the routine goes from step 240 to step 248, where counter value C, which represents the time during which the sulfate flag XSUL1 is set, is incremented by 1. In the following step 249, the desorbed sulfate amount DSUL is calculated using the map shown in FIG. 14. In the following step 250, the adsorbed sulfate amount SQSUL is calculated (SQSUL=SQSUL−DSUL·DLT). In the following step 251, it is judged whether SQSUL is smaller than, or equal to, zero. If SQSUL>0, the routine goes to step 252, where it is judged whether TCATS is within OTSUL. If TCATS is within OTSUL, the processing cycle is ended. If TCATS is outside OTSUL, the routine goes to step 253. If SQSUL≦0 in step 251, the routine also goes to step 253. In step 253, the sulfate flag XSUL1 is reset. In the following step 254, the counter value C is cleared.

Figure 36:
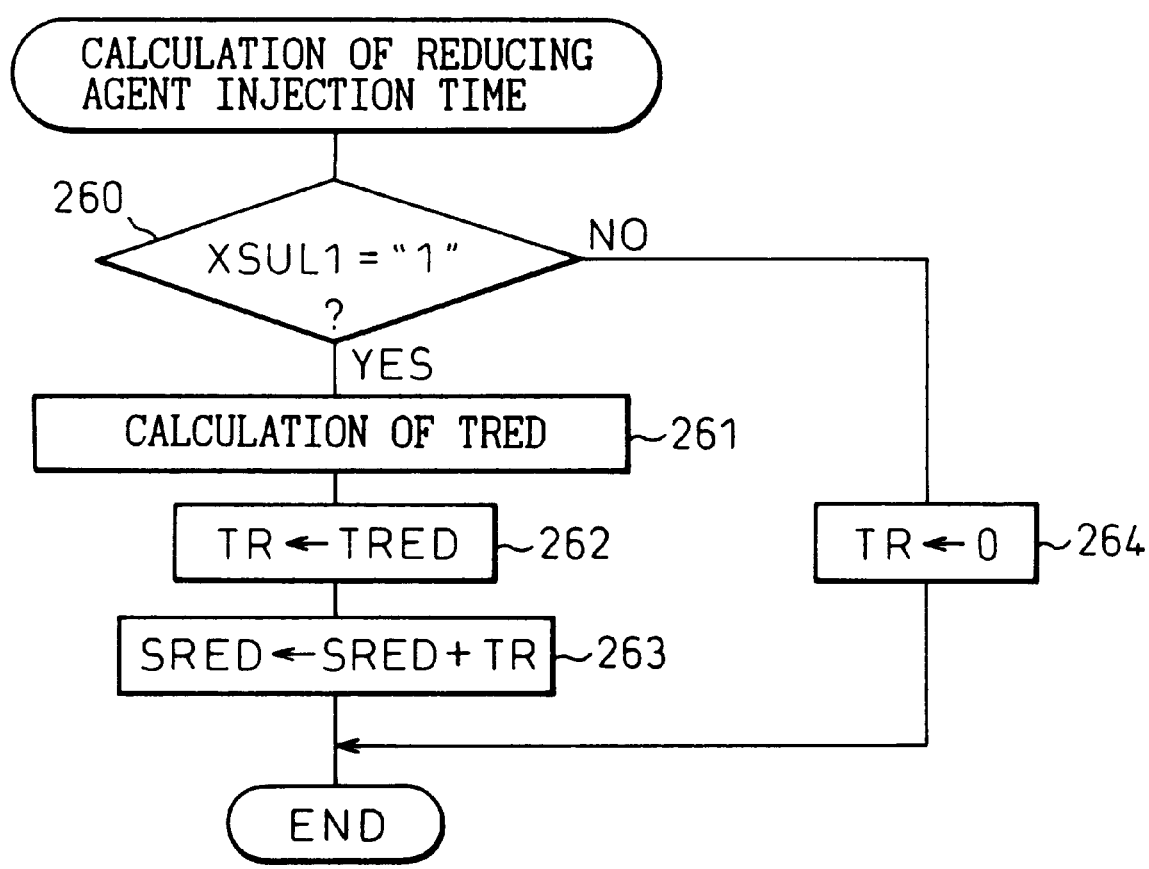
FIG. 36 shows a flowchart for calculating the reducing agent injection time TR according to the fifth embodiment.

FIG. 36 shows a routine for calculating the reducing agent injection time TR. The routine is executed by interruption every predetermined time.

Referring to FIG. 36, first, in step 260, it is judged whether the sulfate flag XSUL1 is set. When the sulfate flag XSUL1 is set, the routine goes to step 261, where TRED is calculated using the map shown in FIG. 34. In the following step 262, the reducing agent injection time TR is set to TRED. Thus, the reducing agent injection by the feeding device 21 is performed. In the following step 263, the cumulative value SRED of the reducing agent injection time TR is calculated (SRED=SRED+TR). When the sulfate flag XSUL1 is reset, the routine goes to step 264, where TR is set to zero. Thus, the reducing agent injection by the feeding device 21 is stopped.

Figure 37:
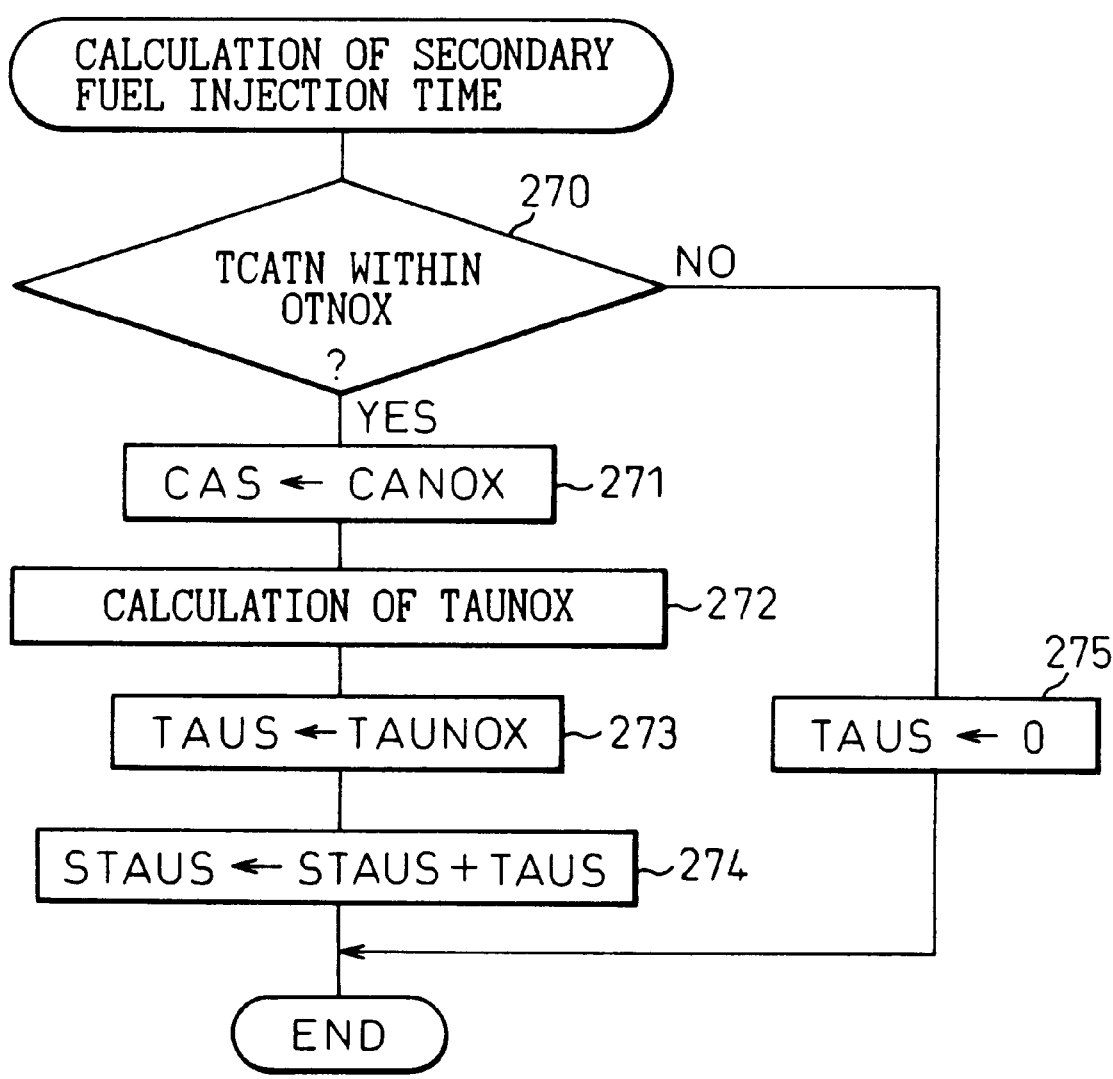
FIG. 37 shows a flowchart for calculating the secondary fuel injection time TAUS according to the fifth embodiment.

FIG. 37 shows a routine for calculating the secondary fuel injection time. The routine is executed by interruption every predetermined time.

Referring to FIG. 37, first, in step 270, it is judged whether the $NO_x$ catalyst temperature TCATN is within the optimum temperature range for $NO_x$ reduction OTNOX. When TCATN is within OTNOX, the routine goes to step 271, where the secondary fuel injection timing CAS is set to CANOX. In the following step 272, TAUNOX is calculated using the map shown in FIG. 2. In the following step 273, the secondary fuel injection time TAUS is set to TAUNOX. Thus, the secondary fuel injection for $NO_x$ reduction is performed. In the following step 274, the cumulative value STAUS of the secondary fuel injection time TAUS is calculated. Contrarily, when TCATN is outside OTNOX, the routine goes to step 275, where TAUS is set to zero. Thus, the secondary fuel injection is stopped.

Next, the sixth embodiment will be explained. The sixth embodiment is different from the fifth embodiment mentioned above in the point that the sulfate reduction is performed regardless of the adsorbed sulfate amount SQSUL.

Figure 38:
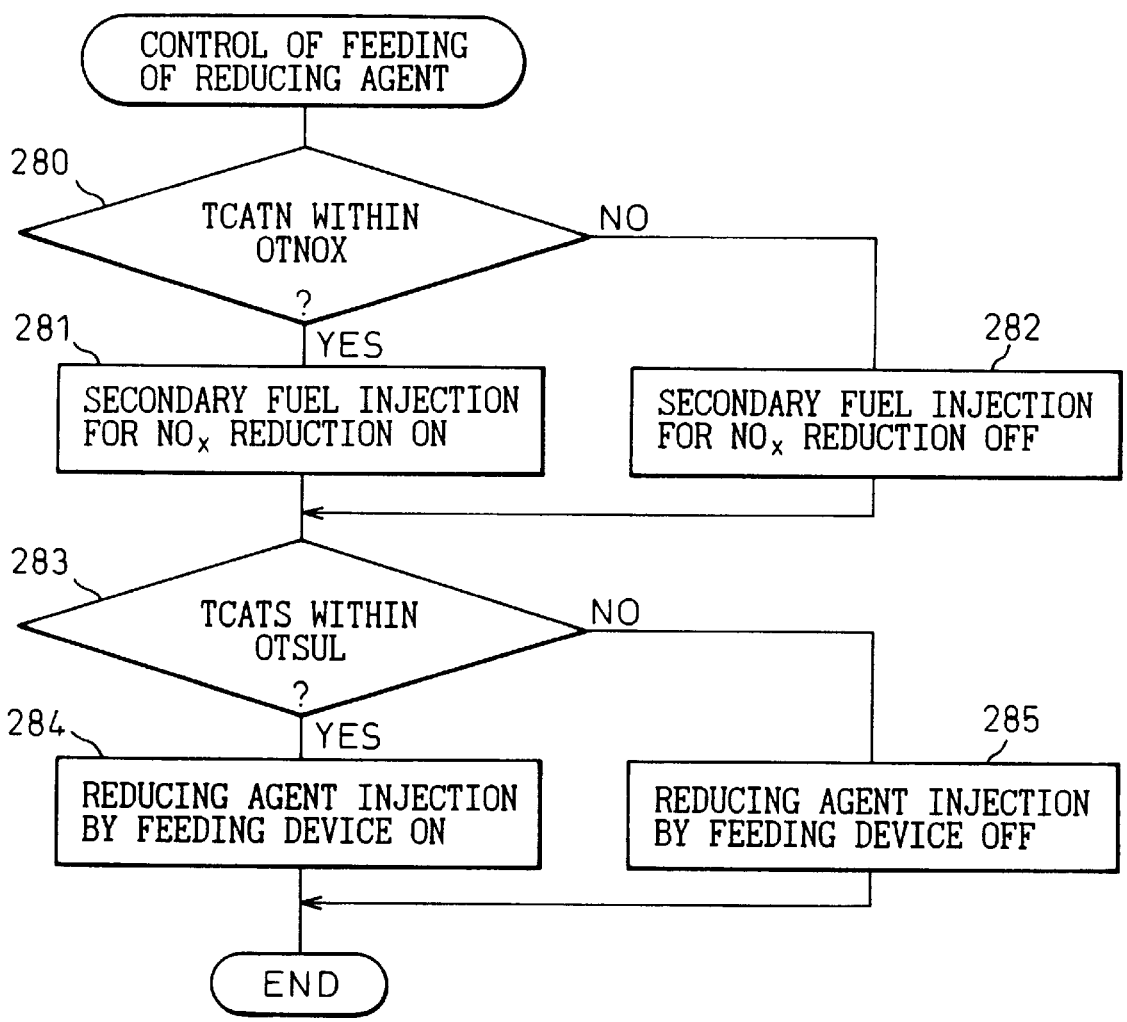
FIG. 38 shows a flowchart for controlling the feeding of the reducing agent according to the sixth embodiment.

FIG. 38 shows a routine for controlling the feeding of the reducing agent. The routine is executed by interruption every predetermined time.

Referring to FIG. 37, first, in step 280, it is judged whether the $NO_x$ catalyst temperature TCATN is within the optimum temperature range OTNOX. When TCATN is within OTNOX, the routine goes to step 281, where the secondary fuel injection for $NO_x$ reduction is performed (ON). Then, the routine goes to step 283. When TCATN is outside OTNOX, the routine goes to step 282, where the secondary fuel injection for $NO_x$ reduction is stopped (OFF). Then, the routine goes to step 283. In step 283, it is judged whether the sulfate catalyst temperature TCATS is within the optimum temperature range OTSUL. When TCATS is within OTSUL, the routine goes to step 284, where the reducing agent injection by the feeding device 21 is performed (ON). Then, the processing cycle is ended. When TCATS is outside OTSUL, the routine goes to step 285, where the reducing agent injection by the feeding device 21 is stopped (OFF). Then, the processing cycle is ended.

Note that a particulate filter may be housed in the casing 18 and the sulfate reducing catalyst 17b may be carried on the filter. It is known that sulfate is easily adsorbed in the particulate trapped by the filter. Thus, the combination of the filter and the sulfate reducing catalyst 17b reduces the amount of sulfate discharged into the exhaust pipe 19.

According to the present invention, it is possible to provide an exhaust gas purifying device capable of reducing the amount of the reducing agent required for Ireducing sulfate, while maintaining the amount of sulfate discharged from the catalyst small.

While the invention has been described by reference to specific embodiments chosen for purposes of illustration, it should be apparent that numerous modifications could be made thereto by those skilled in the art without departing from the basic concept and scope of the invention.

What is claimed is:

1. An exhaust gas purifying device for an engine having an exhaust passage through which exhaust gas including excess oxygen flows, comprising:
a catalyst arranged in the exhaust passage to purify the exhaust gas, the catalyst having an oxidizing ability;
a feeding device that feeds a reducing agent to the catalyst to make the air-fuel ratio of the exhaust gas flowing into the catalyst rich when sulfate adsorbed in the catalyst is to be desorbed and reduced;
a judging device that obtains an amount of sulfate adsorbed in the catalyst and judges whether the adsorbed sulfate amount is larger than a predetermined amount; and
a controller that controls the feeding device to feed the reducing agent to the catalyst temporarily to desorb the adsorbed sulfate from the catalyst and to reduce the sulfate when the adsorbed sulfate amount is judged to be larger than the predetermined amount;
wherein a rich time, which is a time during which the air-fuel ratio of the exhaust gas flowing into the catalyst is made rich when the sulfate absorbed in the catalyst is to be desorbed and reduced, is controlled in accordance with an engine operating condition.

2. An exhaust gas purifying device according to claim 1, wherein the rich time is set to become shorter as a temperature of the catalyst becomes higher.

3. An exhaust gas purifying device according to claim 1, wherein the rich time is set to become shorter as engine speed becomes higher.

4. An exhaust gas purifying device for an engine having an exhaust passage through which exhaust gas including excess oxygen flows, comprising:
a catalyst arranged in the exhaust passage to purify the exhaust gas, the catalyst having an oxidizing ability;
a feeding device that feeds a reducing agent to the catalyst to make the air-fuel ratio of the exhaust gas flowing into the catalyst rich when sulfate adsorbed in the catalyst is to be desorbed and reduced;
a judging device that obtains an amount of sulfate adsorbed in the catalyst and judges whether the adsorbed sulfate amount is larger than a predetermined amount; and
a controller that controls the feeding device to feed the reducing agent to the catalyst temporarily to desorb the adsorbed sulfate from the catalyst and to reduce the sulfate when the adsorbed sulfate amount is judged to be larger than the predetermined amount;
wherein a degree of richness of the air-fuel ratio of the exhaust gas flowing into the catalyst when the sulfate adsorbed in the catalyst is to be desorbed and reduced, is controlled in accordance with an engine operating condition.

5. An exhaust gas purifying device according to claim 4, wherein the degree of richness is set to become lower as the catalyst temperature becomes lower.

6. An exhaust gas purifying device according to claim 4, wherein the degree of richness is set to become lower as the engine speed becomes higher.

7. An exhaust gas purifying device according to claim 1, wherein the judging device obtains the adsorbed sulfate amount on the basis of the engine operating condition.

8. An exhaust gas purifying device according to claim 7, wherein the judging device comprises a device that obtains a cumulative amount of fuel fed to the engine, and judges that the adsorbed sulfate amount is larger than the predetermined amount when the cumulative fuel amount is larger than a set value.

9. An exhaust gas purifying device for an engine having an exhaust passage through which exhaust gas including excess oxygen flows, comprising:
a catalyst arranged in the exhaust passage to purify the exhaust gas, the catalyst having an oxidizing ability, the catalyst having an optimum temperature range for sulfate reduction;
a feeding device that feeds a reducing agent to the catalyst;
a judging device that obtains an amount of sulfate adsorbed in the catalyst and judges whether the adsorbed sulfate amount is larger than a predetermined amount;
a controller that controls the feeding device to feed the reducing agent to the catalyst temporarily to desorb the adsorbed sulfate from the catalyst and to reduce the sulfate when the adsorbed sulfate amount is judged to be larger than the predetermined amount; and
a determination device that determines whether the catalyst temperature is within the optimum temperature range for sulfate reduction, wherein the reducing agent is fed to the catalyst when the adsorbed sulfate amount is judged to be larger than the predetermined amount and the catalyst temperature is determined to be within the optimum temperature range for sulfate reduction, to desorb and reduce sulfate adsorbed in the catalyst.

10. An exhaust gas purifying device according to claim 9, wherein the catalyst has an optimum temperature range for $NO_x$ reduction, the device further comprises a second determination device that determines whether the catalyst temperature is within the optimum temperature range for $NO_x$ reduction, and the reducing agent is fed to the catalyst when the catalyst temperature is determined to be within the optimum temperature range for $NO_x$ reduction, to reduce $NO_x$ in the catalyst.

11. An exhaust gas purifying device according to claim 10, wherein an upper threshold of the optimum temperature range for sulfate reduction is set to be higher than an upper threshold of the optimum temperature range for $NO_x$ reduction, and a lower threshold of the optimum temperature range for sulfate reduction is set to be higher than a lower threshold of the optimum temperature range for $NO_x$ reduction.

12. An exhaust gas purifying device according to claim 9, further comprising a temperature controller that controls the catalyst temperature within the optimum temperature range for sulfate reduction.

13. An exhaust gas purifying device according to claim 12, wherein the temperature controller comprises a fuel injector for feeding fuel directly into the combustion chamber of the engine, the fuel injector performs a secondary fuel injection at the expansion stroke or the beginning of the exhaust stroke of the engine to feed fuel to the catalyst to heat the catalyst.

14. An exhaust gas purifying device according to claim 9, wherein the first determination device comprises a temperature sensor arranged in the exhaust passage downstream of the catalyst for sensing the temperature of the exhaust gas discharged from the catalyst, and determines whether the catalyst temperature is within the optimum temperature range for sulfate reduction on the basis of the exhaust gas temperature.

15. An exhaust gas purifying device according to claim 9, further comprising that detects a rapid acceleration of the engine, the first determination device determines that the catalyst temperature is within the optimum temperature range for sulfate reduction during a second set period which starts just after a first set period has past since the rapid acceleration of the engine is detected.

16. An exhaust gas purifying device according to claim 9, wherein the catalyst comprises a $NO_x$ reducing catalyst arranged in the exhaust passage and a sulfate reducing catalyst arranged in the exhaust passage downstream of the $NO_x$ reducing catalyst, the $NO_x$ reducing catalyst having a higher oxidizing ability and a lower sulfate adsorbing ability, the sulfate reducing catalyst having a lower oxidizing ability and a higher sulfate adsorbing ability, the sulfate reducing catalyst further having an optimum temperature range for sulfate reduction, the judging device obtains an amount of sulfate adsorbed in the sulfate reducing catalyst and judges whether the adsorbed sulfate amount is larger than a predetermined amount, the first determination device determines whether the temperature of the sulfate reducing catalyst is within the optimum temperature range for sulfate reduction of the sulfate reducing catalyst, and the reducing agent is fed to the sulfate reducing catalyst when the adsorbed sulfate amount is judged to be larger than the predetermined amount and the temperature of the sulfate reducing catalyst is determined to be within the optimum temperature range for sulfate reduction, to desorb and reduce sulfate adsorbed in the sulfate reducing catalyst.

17. An exhaust gas purifying device according to claim 16, wherein the feeding device comprises a reducing agent injector arranged in the exhaust passage between the $NO_x$ reducing catalyst and the sulfate reducing catalyst for feeding the reducing agent to the sulfate reducing catalyst.

18. An exhaust gas purifying device for an engine having an exhaust passage through which exhaust gas including excess oxygen flows, comprising:

a catalyst arranged in the exhaust passage to purify the exhaust gas, the catalyst having an oxidizing ability;

a feeding device that feeds a reducing agent to the catalyst;

a judging device that obtains an amount of sulfate adsorbed in the catalyst and judges whether the adsorbed sulfate amount is larger than a predetermined amount;

a controller that controls the feeding device to feed the reducing agent to the catalyst temporarily to desorb the adsorbed sulfate from the catalyst and to reduce the sulfate when the adsorbed sulfate amount is judged to be larger than the predetermined amount; and wherein the feeding device feeds the reducing agent to the catalyst continuously while sulfate reduction is stopped to reduce $NO_x$ in the catalyst.

19. An exhaust gas purifying device according to claim 18, wherein the concentration of the reducing agent in the exhaust gas flowing into the catalyst when the reducing agent is fed to reduce sulfate is set higher than the concentration of the reducing agent in the exhaust gas flowing into the catalyst when the reducing agent is fed to reduce $NO_x$.

20. An exhaust gas purifying device according to claim 18, wherein the feeding means comprises a fuel injector for feeding fuel directly into the combustion chamber of the engine, the fuel injector performs a secondary fuel injection at the expansion stroke or the exhaust stroke of the engine to feed fuel as the reducing agent to the catalyst to reduce the sulfate or the $NO_x$, and the timing of the secondary fuel injection for reducing sulfate is set to be retarded with respect to the timing of the secondary fuel injection for reducing $NO_x$.

21. An exhaust gas purifying device according to claim 1, wherein the feeding means comprises a fuel injector that feeds fuel directly into the combustion chamber of the engine, the fuel injector performs a secondary fuel injection at the expansion stroke or the exhaust stroke of the engine to feed fuel as the reducing agent to the catalyst.

22. An exhaust gas purifying device for an engine having an exhaust passage through which exhaust gas including excess oxygen flows, comprising:

a catalyst arranged in the exhaust passage to purify the exhaust gas, the catalyst having an oxidizing ability;

a feeding device that feeds a reducing agent to the catalyst;

a judging device that obtains an amount of sulfate adsorbed in the catalyst and judges whether the adsorbed sulfate amount is larger than a predetermined amount;

a controller that controls the feeding device to feed the reducing agent to the catalyst temporarily to desorb the adsorbed sulfate from the catalyst and to reduce the sulfate when the adsorbed sulfate amount is judged to be larger than the predetermined amount; and wherein a concentration of the reducing agent in the exhaust gas flowing into the catalyst is set to keep the concentration of the reducing agent in the exhaust gas discharged from the catalyst lower than an allowable value.

23. An exhaust gas purifying device for an engine having an exhaust passage through which exhaust gas including excess oxygen flows, comprising:

a catalyst arranged in the exhaust passage to purify the exhaust gas, the catalyst having an oxidizing ability;

a feeding device that feeds a reducing agent to the catalyst;

a judging device that obtains an amount of sulfate adsorbed in the catalyst and judges whether the adsorbed sulfate amount is larger than a predetermined amount;

a controller that controls the feeding device to feed the reducing agent to the catalyst temporarily to desorb the adsorbed sulfate from the catalyst and to reduce the sulfate when the adsorbed sulfate amount is judged to be larger than the predetermined amount; and wherein the reducing agent is fed to the catalyst intermittently when the sulfate adsorbed in the catalyst is to be desorbed and reduced.

24. An exhaust gas purifying device according to claim 1, further comprising reducing device that reduces an amount of intake air, wherein the intake air amount is reduced when the sulfate adsorbed in the catalyst is to be desorbed and reduced, with respect to the intake air amount at the usual engine operation.

25. An exhaust gas purifying device according to claim 24, wherein the reducing device comprises an intake air control valve arranged in an intake passage of the engine, the opening of the intake air control valve is made smaller when the sulfate adsorbed in the catalyst is to be desorbed and reduced, than the valve opening at the usual engine operation.

26. An exhaust gas purifying device according to claim 3, wherein the catalyst comprises a precious metal comprising at least one of platinum, palladium, rhodium, and iridium, or a transition metal comprising at least one of copper, iron, cobalt, and nickel, which is carried on a porous carrier.

27. An exhaust gas purifying device according to claim 3, wherein the catalyst comprises a porous material comprising at least one of zeolite, ferrierite, mordenite, and alumina.

28. An exhaust gas purifying device according to claim 1, wherein the air-fuel mixture is burned in the combustion chamber of the engine with an excess of air.

* * * * *